(12) United States Patent
Kobayashi et al.

(10) Patent No.: US 7,603,409 B2
(45) Date of Patent: Oct. 13, 2009

(54) PROVIDING AN ALBUM TO A COMMUNICATION TERMINAL VIA A NETWORK

(75) Inventors: Makoto Kobayashi, Tokyo (JP); Kenji Maeda, Kanagawa (JP); Kotaro Yamaguchi, Tokyo (JP); Jin Sunata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 10/434,163

(22) Filed: May 9, 2003

(65) Prior Publication Data

US 2003/0217118 A1   Nov. 20, 2003

(30) Foreign Application Priority Data

May 16, 2002   (JP)   ............................. 2002-141622

(51) Int. Cl.
*G06F 15/16*   (2006.01)
(52) U.S. Cl. .................. 709/203; 358/453; 358/462; 715/828; 715/838; 715/864
(58) Field of Classification Search ................ 709/204, 709/229, 246, 250, 201, 203, 217; 345/428, 345/419, 581; 348/207, 239, 231.2; 382/311, 382/300, 284; 707/104.1, 10, 3, 9; 358/1.18, 358/1.15, 453; 386/46; 715/500.1; 725/105; 705/400

See application file for complete search history.

(56) References Cited

U.S. PATENT DOCUMENTS

| 6,035,323 | A  | * | 3/2000  | Narayen et al. ............. 709/201 |
| 6,049,821 | A  | * | 4/2000  | Theriault et al. ............ 709/203 |
| 6,085,249 | A  | * | 7/2000  | Wang et al. ................. 709/229 |
| 6,453,361 | B1 | * | 9/2002  | Morris ....................... 709/250 |
| 6,492,985 | B1 | * | 12/2002 | Mutz et al. .................. 345/419 |
| 6,577,311 | B1 | * | 6/2003  | Crosby et al. ............... 345/428 |
| 6,578,072 | B2 | * | 6/2003  | Watanabe et al. ........... 709/217 |
| 6,616,700 | B1 | * | 9/2003  | Thum et al. .............. 715/500.1 |

(Continued)

FOREIGN PATENT DOCUMENTS

JP   10-341269   12/1998

(Continued)

OTHER PUBLICATIONS

Yoko Kobayashi, "A work revolution with a digital camera—Receiving on-site pictures in a second!", Nikkei IT 21Nikkei Business Publication, pp. 41-57, published on Jan. 1, 2002.

(Continued)

*Primary Examiner*—Dustin Nguyen
(74) *Attorney, Agent, or Firm*—Fitzpatrick, Cella, Harper & Scinto

(57) ABSTRACT

An information processing apparatus on a network stores data in the form of albums in each of which a plurality of data are archived, and the information processing apparatus provides stored albums to communication terminals via the network in an efficient manner. The information processing apparatus detects the device type of a communication terminal and determines whether a part or all of data included in an album should be provided at a time to the communication terminal, depending on the detected type of the communication terminal. This makes it possible even for a communication terminal having low communication performance to receive data via the network without encountering an error.

11 Claims, 24 Drawing Sheets

U.S. PATENT DOCUMENTS

| | | | |
|---|---|---|---|
| 6,636,648 B2 * | 10/2003 | Loui et al. ................... | 382/284 |
| 6,757,684 B2 * | 6/2004 | Svendsen et al. .............. | 707/10 |
| 6,760,128 B2 * | 7/2004 | Jackson et al. .............. | 358/453 |
| 6,829,006 B1 * | 12/2004 | Hayashi ................... | 348/231.2 |
| 6,914,694 B1 * | 7/2005 | Ichikawa et al. ........... | 358/1.15 |
| 6,961,754 B2 * | 11/2005 | Christopoulos et al. ..... | 709/204 |
| 6,999,637 B1 * | 2/2006 | Anderson et al. ........... | 382/311 |
| 7,050,097 B2 * | 5/2006 | Schick et al. .............. | 348/239 |
| 7,197,531 B2 * | 3/2007 | Anderson .................. | 709/203 |
| 7,202,893 B2 * | 4/2007 | Schick et al. .............. | 348/239 |
| 7,206,781 B2 * | 4/2007 | Miyamoto et al. ............. | 707/9 |
| 7,259,879 B2 | 8/2007 | Yoshino | |
| 7,307,636 B2 * | 12/2007 | Matraszek et al. .......... | 345/581 |
| 7,310,628 B2 * | 12/2007 | Sugimoto et al. ............. | 707/3 |
| 2001/0054157 A1 | 12/2001 | Fukumoto | |
| 2002/0092029 A1 * | 7/2002 | Smith ........................ | 725/105 |
| 2002/0191867 A1 * | 12/2002 | Le et al. .................... | 382/300 |
| 2003/0117651 A1 * | 6/2003 | Matraszek et al. ......... | 358/1.18 |
| 2003/0142953 A1 * | 7/2003 | Terada et al. ................ | 386/46 |
| 2003/0231240 A1 * | 12/2003 | Wilkins et al. ......... | 348/207.99 |
| 2004/0003117 A1 * | 1/2004 | McCoy et al. ............... | 709/246 |
| 2004/0243635 A1 * | 12/2004 | Christophersen et al. . | 707/104.1 |
| 2008/0065566 A1 * | 3/2008 | Eglen et al. ................ | 705/400 |

FOREIGN PATENT DOCUMENTS

| | | |
|---|---|---|
| JP | 11-272840 | 10/1999 |
| JP | 2000-123105 | 4/2000 |
| JP | 2001-134529 | 5/2001 |
| JP | 2001-350718 | 12/2001 |
| JP | 2002-007345 | 1/2002 |
| JP | 2002-041910 | 2/2002 |
| WO | 01/65376 | 9/2001 |
| WO | WO 01/86511 A2 * | 11/2001 |

OTHER PUBLICATIONS

Naoyuki Uhashi, Power Programming with Power Plant—The Third Macintosh Developer's Journal, 27th edition, Gijutsu-Hyohron Co., Ltd., pp. 122-129, published on Oct. 15, 1997.

Japanese Office Action dated Nov. 27, 2007 issued during prosecution of Japanese counterpart JP2002-141622.

* cited by examiner

| ITEM | DATA TYPE | |
|---|---|---|
| USER ID | INTEGER | 401 |
| USER E-MAIL ADDRESS | 64-BYTE STRING | 402 |
| LOGIN NAME | 64-BYTE STRING | 403 |
| PASSWORD | 64-BYTE STRING | 404 |
| SECOND NAME | 64-BYTE STRING | 405 |
| FIRST NAME | 64-BYTE STRING | 406 |
| SECOND NAME PRONUNCIATION | 64-BYTE STRING | 407 |
| FIRST NAME PRONUNCIATION | 64-BYTE STRING | 408 |
| ZIP CODE (1) | 8-BYTE STRING | 409 |
| ZIP CODE (2) | 8-BYTE STRING | 410 |
| PREFECTURE CODE | INTEGER | 411 |
| ADDRESS (1) | 256-BYTE STRING | 412 |
| ADDRESS (2) | 256-BYTE STRING | 413 |
| PHONE NUMBER (1) | 8-BYTE STRING | 414 |
| PHONE NUMBER (2) | 8-BYTE STRING | 415 |
| PHONE NUMBER (3) | 8-BYTE STRING | 416 |
| USER REGISTRATION STATUS | INTEGER | 417 |

| ITEM | DATA TYPE | |
|---|---|---|
| USER ID | INTEGER | 501 |
| ALBUM ID | INTEGER | 502 |
| ALBUM DISPLAY ORDER | INTEGER | 503 |

| ITEM | DATA TYPE | |
|---|---|---|
| ALBUM ID | INTEGER | ~601 |
| ALBUM NAME | 64-BYTE STRING | ~602 |
| COMMENT | 256-BYTE STRING | ~603 |
| PROVIDE ALLOWANCE | INTEGER | ~604 |
| PASSWORD NECESSITY | INTEGER | ~605 |
| ALBUM PASSWORD | 64-BYTE STRING | ~606 |
| PRINT ALLOWANCE | INTEGER | ~607 |
| ORIGINAL DATA ALLOWANCE | INTEGER | ~608 |
| DISPLAY FORMAT NUMBER | INTEGER | ~609 |
| PROHIBITION OF VIEWING | INTEGER | ~610 |
| NUMBER OF TIMES VIEWED | INTEGER | ~611 |
| NUMBER OF TIMES VIEWED BY PORTABLE TERMINALS | INTEGER | ~612 |

| ITEM | DATA TYPE | |
|---|---|---|
| ALBUM ID | INTEGER | ~701 |
| IMAGE ID | INTEGER | ~702 |
| IMAGE DISPLAY NUMBER | INTEGER | ~703 |
| NUMBER OF IMAGE DATA | INTEGER | ~704 |

| ITEM | DATA TYPE | |
|---|---|---|
| IMAGE ID | INTEGER | 801 |
| USER ID | INTEGER | 802 |
| IMAGE NAME | 64-BYTE STRING | 803 |
| ORIGINAL IMAGE FILE PATH | 256-BYTE STRING | 804 |
| THUMBNAIL FILE PATH | 256-BYTE STRING | 805 |
| DISPLAY IMAGE FILE PATH | 256-BYTE STRING | 806 |
| COMMENT | 256-BYTE STRING | 807 |
| NUMBER OF TIMES VIEWED | INTEGER | 808 |
| NUMBER OF TIMES PRINTED | INTEGER | 809 |
| NUMBER OF TIMES VIEWED BY PORTABLE TERMINALS | INTEGER | 810 |
| PROHIBITION OF VIEWING | INTEGER | 811 |

| ITEM | DATA TYPE | |
|---|---|---|
| SESSION ID | INTEGER | 901 |
| LAST ACCESS DATE | 64-BYTE STRING | 902 |
| ACCESS DATE | 64-BYTE STRING | 903 |
| USER ID | INTEGER | 904 |
| RECORD ATTRIBUTE | 1-BYTE STRING | 905 |

| ITEM | DATA TYPE | |
|---|---|---|
| SESSION ID | INTEGER | ~1001 |
| ALBUM ID | INTEGER | ~1002 |
| ALBUM NAME | 64-BYTE STRING | ~1003 |
| ALBUM COMMENT | 256-BYTE STRING | ~1004 |
| NUMBER OF IMAGE DATA | INTEGER | ~1005 |

| ITEM | DATA TYPE | |
|---|---|---|
| SESSION ID | INTEGER | ~1101 |
| IMAGE ID | INTEGER | ~1102 |
| ALBUM ID | INTEGER | ~1103 |
| IMAGE NAME | 64-BYTE STRING | ~1104 |
| IMAGE COMMENT | 256-BYTE STRING | ~1105 |
| IMAGE PATH | 256-BYTE STRING | ~1106 |
| IMAGE NUMBER | INTEGER | ~1107 |

ALBUM
DATA SIZE USED BY MR. XXXX
3.5MB (17%)

- MY ALBUM
- ALBUM #2
- ALBUM #3
- ALBUM #4
- ALBUM #5

ALBUM EDIT
| PROPERTY | NOTIFICATION | CREATE NEW ALBUM | DELETE | CHANGE USER INFORMATION |
| --- | --- | --- | --- | --- |

UPLOAD | PRINT ORDER | Logout

IMAGE EDIT
- ROTATE CLOCKWISE BY 90°
- ROTATE COUNTERCLOCKWISE BY 90°
- DELETE
- MOVE
- COPY
- CHANGE ORDER

MY ALBUM — 1501

☐ PICTURE #1 — 1502   1503
COMMENT : XXXXXXX
NUMBER OF TIMES VIEWED : 32 — 1504
NUMBER OF PRINTS : 3 — 1505

1506

☐ SCANNER
COMMENT : XXXXXXX
NUMBER OF TIMES VIEWED : 17
NUMBER OF PRINTS : 1

☐ DIGITAL CAMERA
COMMENT :
NUMBER OF TIMES VIEWED : 30
NUMBER OF PRINTS : 10

FIG. 17

NOTIFICATION OF RELEASE OF AN ALBUM

The album is to be released at the following URL : — 1708
http://www.xxx.com/PhotoSite/UserAlbum/AlbumEntry.cgi?AlbumID=AJNWDMF
— 1709

Album ID of the released album : AJNWDMF

Receiver's mail address : | aaa@yyy.co.jp | — 1702

Sender's mail address : | bbb@zzz.ne.jp | — 1703

Mail title : | Notification of release of an album | — 1704

Message : | Thank you for your cooperation.
Pictures of the product presentation performed
the other day have been uploaded.
Please view the uploaded pictures and
let me know your comments. | — 1705

[TRANSMIT] — 1706   [CANCEL] — 1707

Date: Sat. 23 Jun 2001 02:34:56 +0900
From: PhotoSite<yyy@xxxxx.co.jp>
To: aaa@zz.ne.jp
Subject: Notification of release of an album
Error-to: yyy@xxxxx.co.jp
Content-Type: text/plain; charset="ISO-2022-JP"
Content-Transfer-Encoding: 7bit The album of the photo site can be viewed at the following URL :
  http://www.xxx.com/PhotoSite/UserAlbum/AlbumEntry.cgi?AlbumID=AJNWDMF  ~1801
The album can also be viewed by specifying the album ID as
  AJNWDMF ~1802
at
  http://www.xxx.com/PhotoSite/

Message from the sender:
    Thank you for your cooperation. Pictures of the product presentation performed the other day have been uploaded. Please view the uploaded pictures and let me know your comments.
End of Message

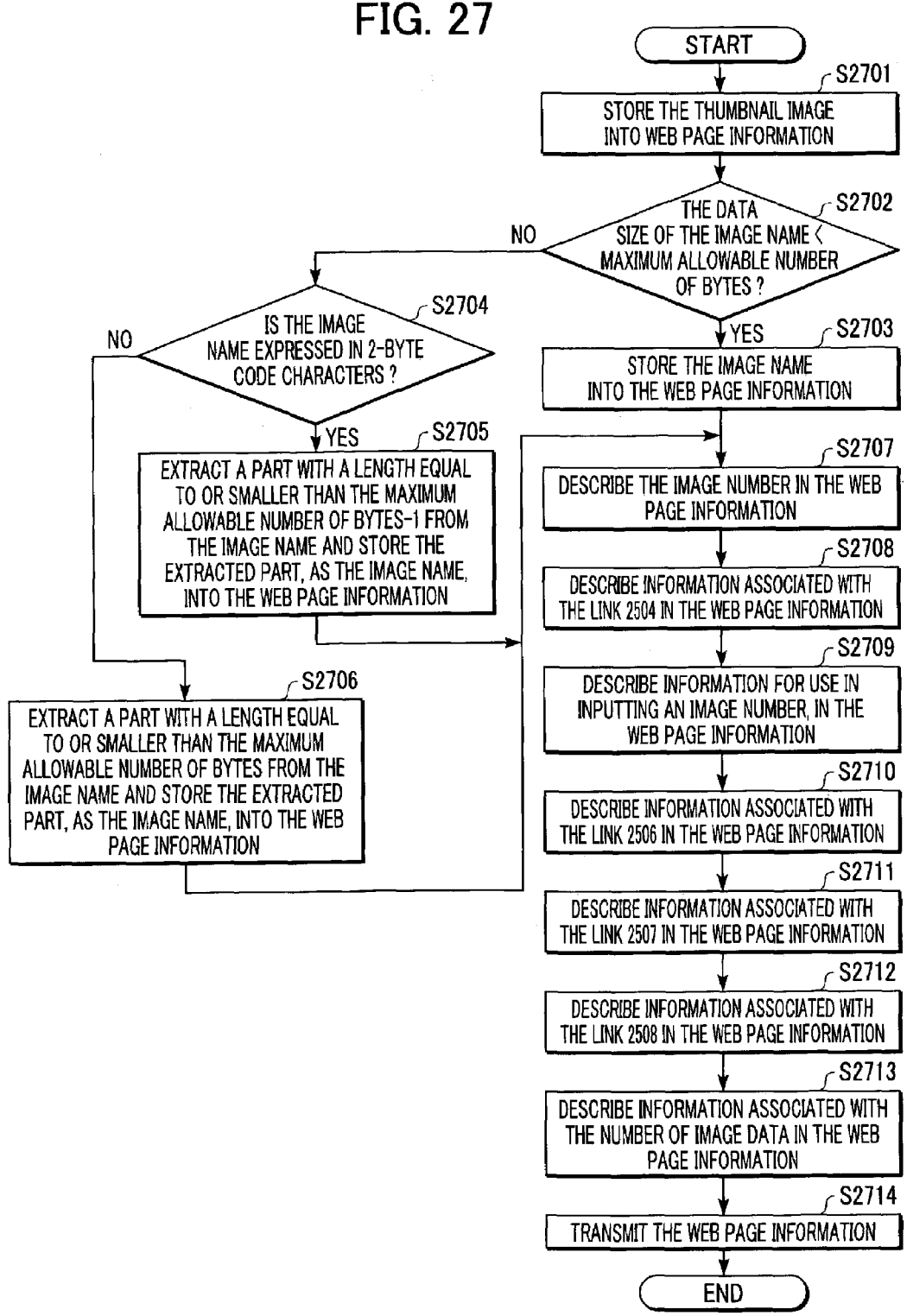

PROVIDING AN ALBUM TO A COMMUNICATION TERMINAL VIA A NETWORK

BACKGROUND OF THE INVENTION

1. Field of the Invention

The present invention relates to an information processing system, an information processing apparatus, an information processing method, a program implementing the information processing method, and a storage medium having such a program stored thereon readably by the information processing apparatus, for storing a plurality of content data in the form of albums and providing albums to communication terminals connected via a network.

2. Description of the Related Art

Recent improvements and advances in infrastructures and technology associated with information processing and communication have made it possible to provide various kinds of services via the Internet.

For example, a site called a photo site provides a service in which images taken by users using a digital camera, a scanner, or the like are transmitted to the photo site via the Internet, and the photo site stores the received images and provides the stored images to users in response to requests from users.

Some photo sites store a plurality of images in the form of albums in which images received from users are archived and release the albums so that general users can view the albums. In some of those photo sites, only particular third persons specified by users are permitted to view albums via the Internet. In this case, photo sites inform particular third persons that albums have been released so that particular third persons may view the albums by using personal computers or portable information/communication terminals.

In the album providing service described above, because of limitations of portable communication terminals in terms of the memory capacity and the transmission rate at which data is transmitted/received, it takes a long time to display an album on a portable communication terminal if the album includes many images. In addition, portable communication terminals, because of a restriction imposed by carriers on the communication time, communication is disconnected before an album including large size data is displayed on a portable communication terminal. Unlike personal computers capable of displaying a plurality of images at a time, portable communication terminals cannot display a plurality of images on their display with limited sizes. Although a plurality of images may be displayed at a time, the images are displayed in a limited display area that is not good enough for users to view.

SUMMARY OF THE INVENTION

In view of the above, it is an object of the present invention to provide an information processing system, an information processing apparatus, an information processing method, a program implementing the information processing method, and a storage medium having such a program stored thereon readably by the information processing apparatus, for storing a plurality of content data in the form of albums and providing albums to communication terminals connected via a network.

According to an aspect of the present invention, there is provided an information processing system for storing a plurality of data in the form of an album and providing the album to a communication terminal via a network, comprising an outputting unit for selectively outputting first information or second information, the first information being for providing a part of data included in the album to the communication terminal, the second information being for providing all data included in the album to the communication terminal, a detection unit for detecting a type of the communication terminal, and a control unit for controlling the outputting unit so as to selectively output either the first information or the second information depending on the type detected by the detection unit.

According to another aspect of the present invention, there is provided an information processing apparatus comprising a connection unit for making a connection with a server for storing a plurality of data in the form of an album, and an outputting unit for outputting information for providing a part of data included in the album stored in the server to a communication terminal, wherein the connection unit makes a connection with the server depending on a type of the communication terminal, and the information processing apparatus further comprises a second connection unit for making a connection with a data conversion apparatus for converting the information, depending on the type of the communication terminal, and a transmission unit for transmitting information output to the data conversion apparatus connected by the second connection unit.

According to another aspect of the present invention, there is provided an information processing method for storing a plurality of data in the form of an album and providing the album to a communication terminal, comprising the steps of detecting a type of the communication terminal, and outputting information in a mode selected from a plurality of modes depending on the detected type of the communication terminal, the plurality of modes including a mode in which a part of data included in the album is output and a mode in which all data included in the album is output.

According to another aspect of the present invention, there is provided a program for implementing on a computer an information processing method for storing a plurality of data in the form of an album and providing the album to a communication terminal, the information process method comprising the steps of detecting a type of the communication terminal, and outputting information in a mode selected from a plurality of modes depending on the detected type of the communication terminal, the plurality of modes including a mode in which a part of data included in the album is output and a mode in which all data included in the album is output.

According to another aspect of the present invention, there is provided a computer-readable storage medium having a program stored thereon for implementing on a computer an information processing method for storing a plurality of data in the form of an album and providing the album to a communication terminal, the information processing method comprising the steps of detecting a type of the communication terminal, and outputting information in a mode selected from a plurality of modes depending on the detected type of the communication terminal, the plurality of modes including a mode in which a part of data included in the album is output and a mode in which all data included in the album is output.

According to another aspect of the present invention, there is provided an information processing method comprising the steps of making a connection with a server storing a plurality of data in the form of an album, the connection depending on a type of a communication terminal being communicated with via a network, outputting information for providing a part of data included in the album stored in the server to the communication terminal, making a connection with a data conversion apparatus for converting the information, depending on the type of the communication terminal, and transmitting information output to the data conversion apparatus connected in the step of making the connection with the data conversion apparatus.

According to another aspect of the present invention, there is provided a program for implementing an information processing method on a computer, the information processing method comprising the steps of making a connection with a server storing a plurality of data in the form of an album, the connection depending on a type of a communication terminal being communicated with via a network, outputting information for providing a part of data included in the album stored in the server to the communication terminal, making a connection with a data conversion apparatus for converting the information, depending on the type of the communication terminal, and transmitting information output to the data conversion apparatus connected in the step of making the connection with the data conversion apparatus.

According to another aspect of the present invention, there is provided a storage medium having a program stored thereon for implementing an information processing method on a computer, the information processing method comprising the steps of making a connection with a server storing a plurality of data in the form of an album, the connection depending on a type of a communication terminal being communicated with via a network, outputting information for providing a part of data included in the album stored in the server to the communication terminal, making a connection with a data conversion apparatus for converting the information, depending on the type of the communication terminal, and transmitting information output to the data conversion apparatus connected in the step of making the connection with the data conversion apparatus.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing a customer information data table managed by the photo site according to an embodiment of the present invention.

FIG. 5 is a diagram showing a customer album data table managed by the photo site according to an embodiment of the present invention.

FIG. 6 is a diagram showing an album information data table managed by the photo site according to an embodiment of the present invention.

FIG. 7 is a diagram showing an album image data table managed by the photo site according to an embodiment of the present invention.

FIG. 8 is a diagram showing an image information data table managed by the photo site according to an embodiment of the present invention.

FIG. 9 is a diagram showing a mobile session information table managed by the photo site according to an embodiment of the present invention.

FIG. 10 is a diagram showing a mobile album information table managed by the photo site according to an embodiment of the present invention.

FIG. 11 is a diagram showing a mobile image information table managed by the photo site according to an embodiment of the present invention.

FIG. 15 is a diagram showing an example of a screen including detailed album information which allows users to view image data uploaded on the photo site according to an embodiment of the present invention.

FIG. 17 is a diagram showing an example of an album release notification request screen for inputting information associated with notification of release of an album to a third person, according to an embodiment of the present invention.

FIG. 18 is a diagram showing an example of an email for informing a third person that an album has been released, according to an embodiment of the present invention.

FIG. 27 is a flow chart showing a process performed by a photo site to produce Web page information for displaying a mobile album on a browser running on a portable communication terminal, according to an embodiment of the present invention.

DESCRIPTION OF THE PREFERRED EMBODIMENTS

The present invention is described in further detail below with reference to preferred embodiments in conjunction with the accompanying drawings. Note that relative positions of components, display screens, and the like employed in the following embodiments are merely examples which are not intended to limit the scope of the present invention unless otherwise stated. That is, various modifications, additions, and deletions are possible without departing from the scope of the present invention.

In the following embodiments, by way of example, the present invention is applied to an information providing system for providing digital image data via the Internet so that the digital image data is shared by users.

Overview of an Information Providing System

Figure 1:
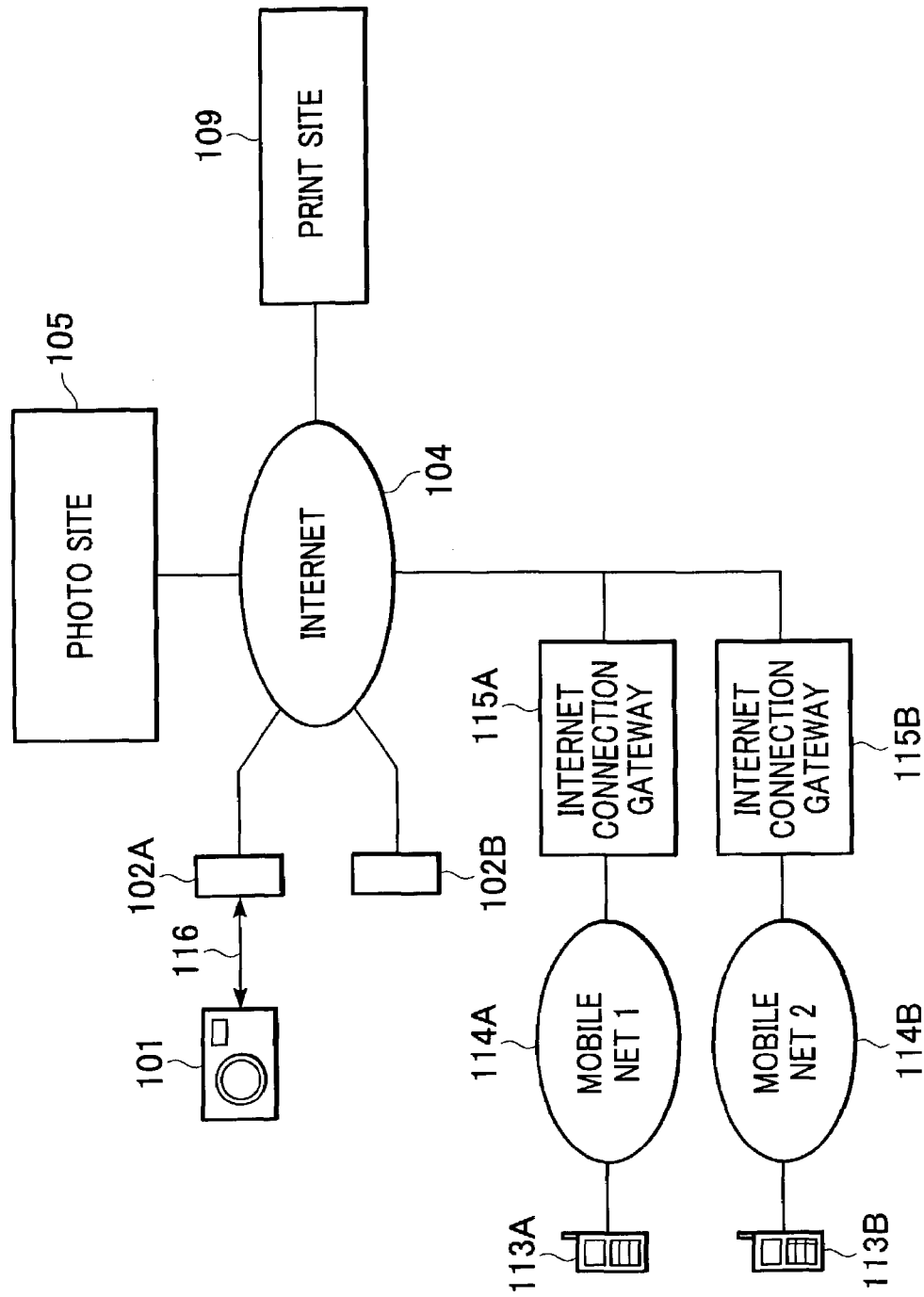
FIG. 1 is a schematic diagram illustrating an overview of an information providing system according to an embodiment of the present invention.

FIG. 1 is a schematic diagram showing an example of an information providing system according to an embodiment of the present invention.

In FIG. 1, reference numeral 101 denotes an image input apparatus such as a digital still camera, a digital video camera, or a scanner, for converting image information in the form of an optical image into an electrical signal, performing image processing thereon, and recording/playing back the resultant image information in digital form.

Reference numerals 102A and 102B denote personal computers (PCs), wherein the PC 102A is used by a user having image data acquired via the image input apparatus 101, and the PC 102B is used by a third person informed that an album produced by the user has been released (hereinafter, the PC 102B will be referred to as the third person's PC 102B).

Reference numeral 116 denotes a data transfer interface for transferring image data stored in the image input apparatus 101 to a storage device such as a hard disk drive (HDD) of the PC 102A. The data transfer interface 116 may be of a wired type based on, for example, the Universal Serial Bus (USB) or IEEE1394 technique, or of a wireless type based on, for example, the InfraRed Data Association (IrDA) or Bluetooth technique.

Reference numerals 113A and 113B denote portable communication terminals such as a portable telephone, a Personal Digital Assistance (PDA) device, or a digital still camera or a digital video camera having a communication capability and a display, wherein the portable communication terminal 113A is used by the user (hereinafter, referred to as the user's portable communication terminal 113A), and the portable communication terminal 113B is used by the third person (hereinafter, referred to as the third person's portable communication terminal 113B).

The PCs 102A and 102B and the portable communication terminals 113A and 113B have Web browsing capability whereby Web page information can be received, using a standard protocol such as http protocol via the Internet 104, from a photo site 105, and the received Web page information can be displayed on the screen of the portable communication terminals 113A and 113B.

Reference numerals 114A and 114B denote mobile communication networks via which the portable communication terminals 113A and 113B transfer and receive various kinds of data.

Reference numerals 115A and 115B denote the Internet gateways for connecting the portable communication terminals 113A and 113B to the Internet 104 via the mobile communication networks 114A and 114B.

Reference numeral 105 denotes a photo site which stores albums of image data received from the user's PC 102A, provides the stored albums to third persons, and requests a print site 109, which will be described in detail later, to print albums stored in the photo site 105.

The print site 109 prints, in response to a request from the photo site 105, image data contained in albums and provides the resultant printed image to the user or third persons. Although not shown in FIG. 1, the site 109 includes a module for printing, a server, and an information processing apparatus. Additionally, although only one print site 109 is shown in FIG. 1, there may be two or more print sites 109. Alternatively, the print site 109 may be disposed in the photo site 105.

Reference numeral 104 denotes the Internet. Communication among the PCs 102A and 102B, the photo site 105, the print site 109, and the portable communication terminals 113A and 113B is performed via the Internet 104.

Example of Configuration of the Photo Site

Figure 2:
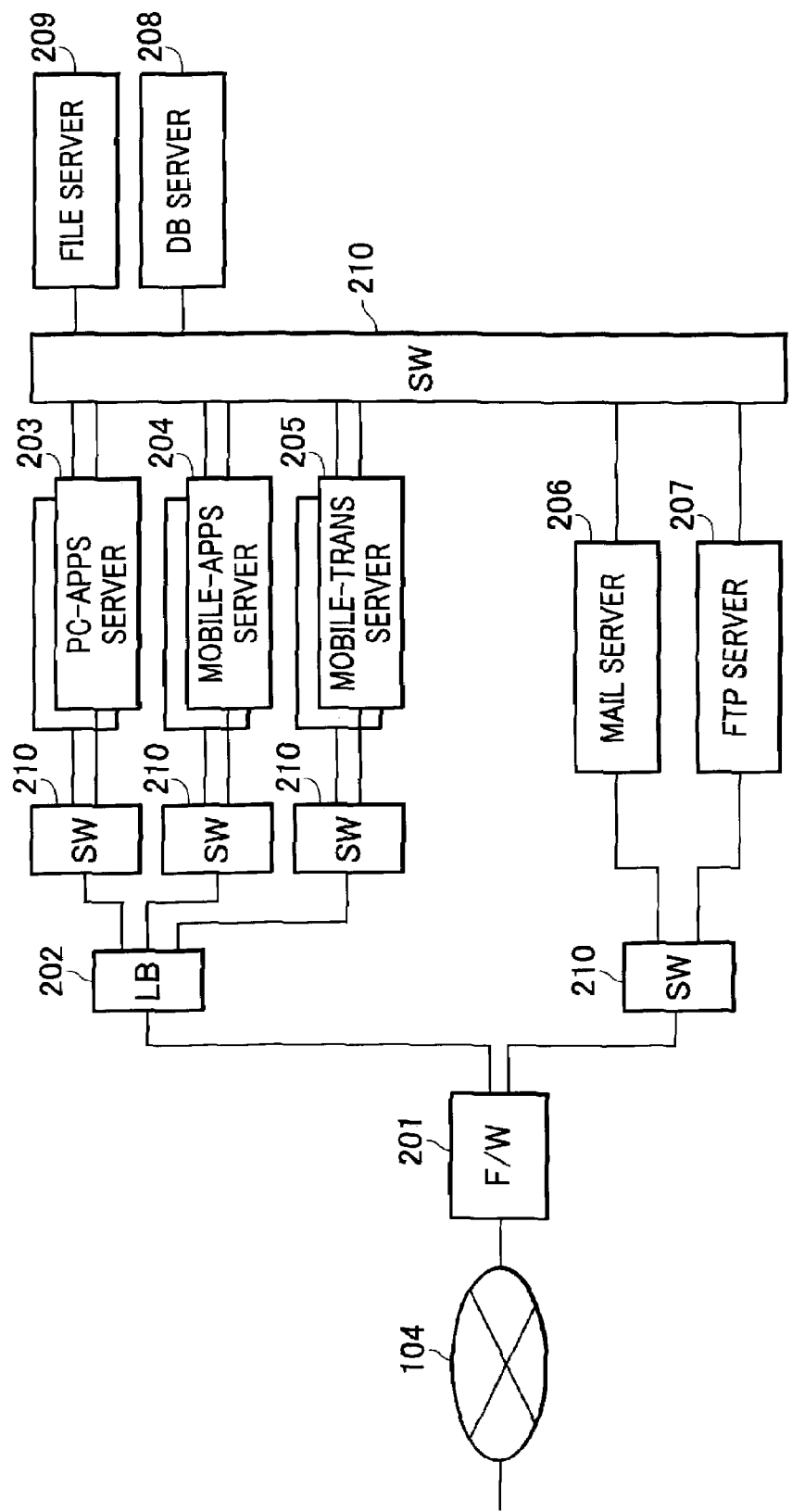
FIG. 2 is a diagram illustrating an example of a photo site according to an embodiment of the present invention.

Referring to FIG. 2, the photo site 105 according to the present embodiment is described in further detail below.

The photo site 105 includes, mainly, a firewall (F/W) 201, a load balancer (LB) 202, a PC application server 203, a mobile application server 204, a content conversion (Mobile-Trans) server 205, a mail server 206, an FTP server 207, a database (DB) server 208, a file server 209, and an Ethernet (R) switch (SW) 210, wherein those severs communicate with each other via an intranet.

The firewall 201 is responsible for blocking unauthorized access or attacks from the outside, thereby ensuring that the servers on the intranet in the photo site 105 can operate securely.

The load balancer 202 distributes loads associated with access from the outside among the servers on the intranet in the photo site 105. The load balancer 202 also has a capability of acquiring information indicating the type of a terminal accessing the photo site 105 and determining whether the access is from one of the portable communication terminals 113A or 113B or one of the PCs 102A or 102B. In a case in which it is determined that the access is from one of the PCs 102A or 102B, the load balancer 202 transfers the access to the PC application server 203. However, in a case in which it is determined that the access is from one the portable communication terminals 113A or 113B, the load balancer 202 transfers the access to the content conversion server (Mobile-Trans) 205.

The PC application server (PC-APPS) 203 and the mobile application server (Mobile-APPS) 204 act as WWW servers for providing various services, and they produce Web page information on the basis of image information and user information acquired, as required, from the DB server 208 or the file server 209. More specifically, the PC application server 203 produces Web page information to be provided to the PCs 102A or 102B, while the mobile application server 204 produces Web page information to be provided to the portable communication terminals 113A or 113B and transmit it to the content conversion server (Mobile-Trans) 205.

The content conversion server (Mobile-Trans) 205 acts as a proxy server for transferring access from the portable communication terminals 113A or 113B to the mobile application server 204.

The content conversion server 205 has a portable-communication-terminal device type information table in which specifications of various types of portable communication terminals 113, and image information formats or markup languages to be used for respective portable communication terminals 113 are described in a relational fashion. For example, the content conversion server 205 extracts device type information of the portable communication terminal 113 from the user-agent information included in the request received, by means of HTTP, from the portable communication terminal 113, and the content conversion server 205 performs data conversion on Web page information depending on the device type of the portable communication terminal 113 in accordance with information described in the portable-communication-terminal device type information table.

In accordance with a command issued by the control of the PC application server 203, the mail server 206 transmits an e-mail to third persons to notify them that the image data has been released.

The FTP server 207 receives the image data transferred from the PC 102, using the ftp protocol.

The file server 209 stores the image data received via the FTP server 207 into a main storage device.

The DB server 208 stores various information, such as image information associated with the image data stored in the file server 209 and user information of users registered in the photo site 105, in various data tables as will be described later.

The above-described photo site 105 according to the present embodiment has the following capabilities.
(1) User Registration: Users who have accessed the photo site 105 via PCs 102 may be registered and user IDs for identifying respective users may be issued.
(2) Uploading Image Data: Image data received from PCs 102 are stored in the form of albums in which a plurality of image data are archived.
(3) Print Order: If a request for printing of an album is received from a user, the photo site 105 orders the print site 109 to print the image data included in a requested album.
(4) Release of Albums: Albums are released for use by PCs 102 or portable communication terminals 113.
(5) Providing Albums to Third Persons: The photo site 105 informs third persons, by means of e-mails or the like, that albums have been released.

Although in the example described above, the servers in the photo site 105 are installed separately and they are connected to each other via a LAN (Local Area Network), the servers may be integrated into a single apparatus.

Example of Hardware Configuration of the DB Server

Figure 3:
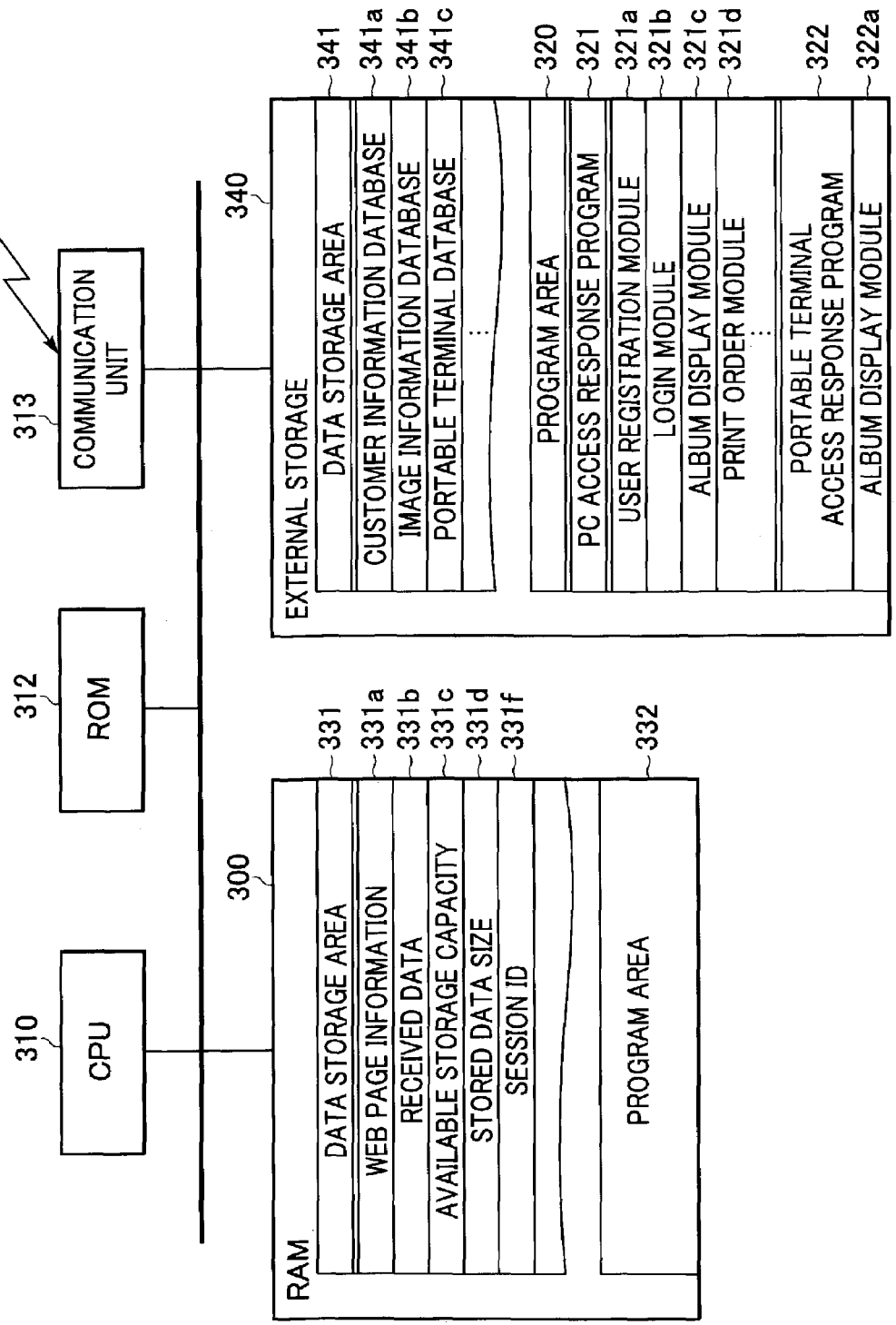
FIG. 3 is a diagram showing an example of a hardware configuration of the photo site according to an embodiment of the present invention.

FIG. 3 shows an example of a hardware configuration of the DB server 208 in the photo site 105 according to the present embodiment of the invention. Note that only major parts including a CPU are shown in FIG. 3, and parts which are not essential to the present invention, such as an input/output device, are not shown.

The DB server 208 includes a central processing unit (CPU) 310, a read only memory (ROM) 312, a random access memory (RAM) 300, and a communication unit 313. The CPU 310 is responsible for controlling the whole operation of the DB server 208. The ROM 312 is a memory capable of only reading data therefrom. Programs and parameters which are not varied are stored in the ROM 312. The RAM 300 is a memory capable of reading and writing data. The RAM 300 includes a data storage area 331 and a program area 332 for temporarily storing data and a program, respectively.

System programs such as an operation system (OS) and a printer driver supplied from an external storage medium 340 and an application program supplied from the outside are loaded into the program area 332 and executed by the CPU 310.

The data stored in the data storage area 331 includes, for example, Web page information 331*a* for displaying image data or the like on portable communication terminals 113, data 331*b* received from portable communication terminals 113, data 331*c* indicating the available memory storage capacity on the basis of which it is determined whether or not image data received from users can be stored, data 331*d* indicating the size of stored image data, and session IDs 331*f* used to identify album view requests issued from portable communication terminals 113.

The external storage medium 340 is preferably a hard disk or the like disposed in the DB server 208. Alternatively, the external storage medium 340 may be a memory card connected to the DB server 208 or a removable/portable storage medium such as a floppy (R) disk, an optical disk such as a compact disk (CD), a magnetic disk, an optical card, an IC card, or a memory card.

The external storage medium 340 includes a data storage area 341 and a program area 320. Data stored in the data storage area 341 includes customer information database 341*a* in which customer information associated with users of image data stored in the file server 209 is described, image information database 341*b* in which image information associated with the image data stored in the file server 209 is described, and portable communication terminal database 341*c* in which information associated with portable communication terminals is described.

The program area 320 is used to store various programs which are loaded into the program area 332 of the RAM 300 and executed. In the case in which a memory card is used as the external storage medium 340, the programs stored in the program area 332 may be directly executed without being loaded into the program area 332 of the RAM 300. Although not shown in FIG. 3, system programs such as the operating system (OS) and the basic input output system (BIOS) are also stored in the program area 320 of the external storage medium 340.

A PC access response program 321 includes a user registration module 321*a*, a login module 321*b*, an album display module 321*c*, and a print order module 321*d*.

A portable communication terminal access response module 322 includes an album display module 322*a*.

Although in the example described above, all respective storage areas are formed in the external storage medium 340 of the DB server 208, the storage areas may be distributed among various servers.

The other servers such as the PC application server 203 and the mobile application server 204 each also include a CPU, a ROM, a RAM, and a communication unit, and data necessary for operations of the respective servers are stored in the ROM or the RAM thereof.

Examples of Databases

Databases stored in the data storage area 341 of the external storage medium 340 are described in further detail below with reference to the figures.

FIG. 4 shows a customer information data table 400 stored in the customer information database 341*a*.

In the photo site 105, if a user is registered in response to access from a user's PC 102A, a user ID is issued to that user and a record associated with that user is created in the customer information data table 400. Each record in the customer information data table 400 includes fields for describing a user ID 401, a user e-mail address 402, a login name 403, a password 404, a last (second) name 405, a first name 406, a last (second) name pronunciation 407, a first name pronunciation 408, a zip code (1) 409, a zip code (2) 410, a prefecture (city) code 411, an address (1) 412, an address (2) 413, a phone number (1) 414, a phone number (2) 415, a phone number (3) 416, and a user registration status 417, wherein data described in respective records of the customer information data table 400 are managed using the user IDs 401 as keys.

When the user registration status 417 has a value of "1", the corresponding user is allowed to use the photo site 105, while the user is not allowed to use the photo site 105 when the user registration status 417 has a value of "0".

If a user of a PC 102A becomes not a member of the photo site 105, the record associated with that user is removed from the customer information data table 400.

FIG. 5 shows a customer album data table 500 stored in the customer information database 341a. In the photo site 105, if an album is produced in the file server 209, an album ID is assigned to that album and a corresponding record is created in the customer album data table 500. Each record in the customer album data table 500 includes fields for describing a user ID 501 of a user who produced an album, an album ID 502 assigned to the album, and an album number 503 indicating the relative position among albums produced by various users. The records of the customer album data table 500 are managed using user IDs 501 as keys.

If an album is removed from the file server 209, a corresponding record stored in the customer album data table 500 is removed.

For the same user, the user ID 501 described in the customer album data table 500 and the user ID 401 described in the customer information data table 400 are identical to each other.

FIG. 6 shows an album information data table 600 stored in the image information database 341b. In the photo site 105, if an album is produced in the file server 209, an album ID is assigned to that album and a corresponding record is created in the album information data table 600. Each record of the album information data table 600 includes fields for describing an album ID 601 assigned to an album, an album name 602, a comment 603 indicating a comment file path associated with the album, provide allowance 604 indicating whether the album is allowed to be provided to third persons, password necessity 605 indicating whether a password is necessary to view the album, an album password 606 necessary to view the album, print allowance 607 indicating whether the album is allowed to be printed, original data allowance 608 indicating whether original image data is allowed to be displayed, a display format number 609 indicating a format in which the album is to be displayed, prohibition of viewing 610 indicating whether the album is prohibited to be viewed, the number of times viewed 611 indicating the number of times the album has been viewed by PCs 102, and the number of times viewed by portable communication terminals 612 indicating the number of times the album has been viewed by portable communication terminals 113. The records of the album information data table 600 are managed using album IDs 601 as keys.

When provide allowance 604 is set to "1", a corresponding album is allowed to be provided to third persons, while the album is not allowed to be provided when the provide allowance 604 is set to "0". In a case in which providing of an album is prohibited by an operator of the photo site 105, the provide allowance is set to "−1".

When a password is necessary to view an album, corresponding password necessity 605 is set to "1", while the password necessity 605 is set to "0" when no password is necessary. In the case in which the password necessity 605 is set to "1", a password is described in a corresponding album password field 606.

If print allowance 607 is set to "1", a corresponding album is allowed to be printed, while the album is not allowed to be printed when the print allowance 607 is set to "0".

When the original data allowance 608 is set to "1", corresponding original image data is allowed to be displayed, while the original image data is not allowed to be displayed when the original data allowance 608 is set to "0".

When the display format number 609 is set to "0", a corresponding album is displayed in the form of thumbnails, while the album is displayed in a high-resolution format when the display format number 609 is set to "1".

When the prohibition of viewing 610 is set to "1", a corresponding album is allowed to be viewed, while the album is prohibited to be viewed when the prohibition of viewing 610 is set to "0". The value of the prohibition of viewing 610 is determined by an operator of the photo site 105.

If an album is removed from the file server 209, a corresponding record stored in the album information data table 600 is removed.

For the same album, the album ID 601 described in the album information data table 600 and the album ID 502 described in the customer album data table 500 are identical to each other.

FIG. 7 shows an album image data table 700 stored in the image information database 341b. In the photo site 105, if image data is uploaded to the file server 209, an image ID is assigned to that image data and a record associated with that image data is created in the album image data table 700. In the present embodiment, the file server 209 stores image data in the form of albums, in each of which a plurality of image data are archived. If image data is removed from the file server 209, a corresponding record stored in the album image data table 700 is removed.

Each record of the album image data table 700 includes fields for describing an album ID 701 indicating an album in which uploaded image data is included, an image ID 702 assigned to that image data, an image display number 703 indicating the relative position among image data included in the album, and the number of image data 704 indicating the number of image data included in the album. For the same album, the album ID 701 described in the album image data table 700, the album ID 601 described in the album information data table 600, and the album ID 502 described in the customer album data table 500 are identical to each other.

FIG. 8 shows an image information data table 800 stored in the image information database 341b. In the photo site 105, if image data is uploaded to the file server 209, image ID is assigned to that image data, and a record associated with that image data is created in the image information data table 800.

Each record of the image information data table 800 includes fields for describing a user ID 802, an image name 803, an original image file path 804 indicating a file path of associated image data, a thumbnail file path 805 indicating a file path of a thumbnail file of the image data, a display image file path 806 indicating a file path of display image file of the image data, a comment 807 indicating a file path of a comment associated with the image data, the number of times viewed 808 indicating the number of times the image data has been viewed by PCs 102, the number of times printed 809 indicating the number of times the image data has been printed, the number of times viewed by portable communication terminals 810 indicating the number of times the image data has been viewed by portable communication terminal, and prohibition of viewing 811 indicating whether the album is prohibited to be viewed by portable communication terminals 113. The records of the image information data table 800 are managed using the image IDs 801 as keys.

If image data is removed from the file server 209, a corresponding record of the image information data table 800 is removed.

For the same user, the user ID 802 described in the image information data table 800, the user ID 501 described in the customer album data table 500, and the user ID 401 described in the customer information data table 400 are identical to each other.

For the same image data, the image ID 801 described in the image information data table 800 and the image ID 702 described in the album data table 500 are identical to each other.

Various databases including records produced by the application server 204 in response to album view requests from portable communication terminals 113 and stored in the DB server 208 are described below with reference to the figures.

FIG. 9 shows a mobile session information table 900 stored in the portable terminal database 341c for managing album view requests from portable communication terminals 113.

One record is created in the mobile session information table 900 each time a new album view request is received from a portable communication terminal 113. Herein, the mobile application server 204 of the photo site 105 assigns a uniquely selected session ID to the album view request and describes the session ID into the session ID field 901. Furthermore, a user ID 904 indicating the user of the album, an access date/time 903 indicating the date/time when the album view request was issued for the first time, and a last access date/time 902 indicating the date/time when the last album view request was issued are described.

The record attribute field 905 may be used to indicate whether the album view request has expired. In this case, the mobile application server 204 checks, at scheduled intervals, the last access date/time 902 of each record in the mobile session information table 900 to determine whether there is a record which has expired. If such a record is detected, a flag is set in the record attribute field 905. This makes it possible to determine whether or not an album view request having a particular session ID has expired, on the basis of the record attribute 905.

FIG. 10 shows a mobile album information table 1000 stored in the portable terminal database 341c, for managing attribute information associated with albums requested by portable communication terminals 113.

One record is created in the mobile album information table 1000 each time a new album view request is received from a portable communication terminal 113. Data identical to the session ID 901 described in the mobile session information table 900 is described in the session ID field 1001 of the mobile album information table 1000. The album ID included in the album view request received from the portable communication terminal 113 is described in the album ID field 1002. Furthermore, a corresponding album name 602 and comment 603 described in the album information data table 600 are detected on the basis of the album ID and copied into the album name field 1003 and the album comment field 1004, respectively.

FIG. 11 shows a mobile image information table 1100 stored in the portable terminal database 341c, for managing attribute information associated with image data included in an album requested by a portable communication terminal 113.

One record is created in the mobile image information table 1100 each time an album is viewed by a portable communication terminal 113. Data identical to the session ID 901 described in the mobile session information table 900 is described in the session ID field 1101 of the mobile image information table 1100. The album ID included in the album view request received from the portable communication terminal 113 is described in the album ID field 1102. Furthermore, a record having an image ID 702 identical to the album ID is retrieved, and data described in the retrieved record of the image information data table 800 are copied into the image name field 1104, the image comment field 1105, the image path field 1106, and the image number field 1107.

Furthermore, the mobile application server 204 acquires image data stored in the file server 209 on the basis of the thumbnail file path 805 described in the image information data table 800 and stores a copy of the image data into a temporary area in the file server 209, dedicated to use by the mobile application server 204. A file path to the copied image data is then described in the image path field 1106 of the mobile image information table 1100.

Process Performed by the Photo Site to Upload Image Data from a PC

Figure 12:
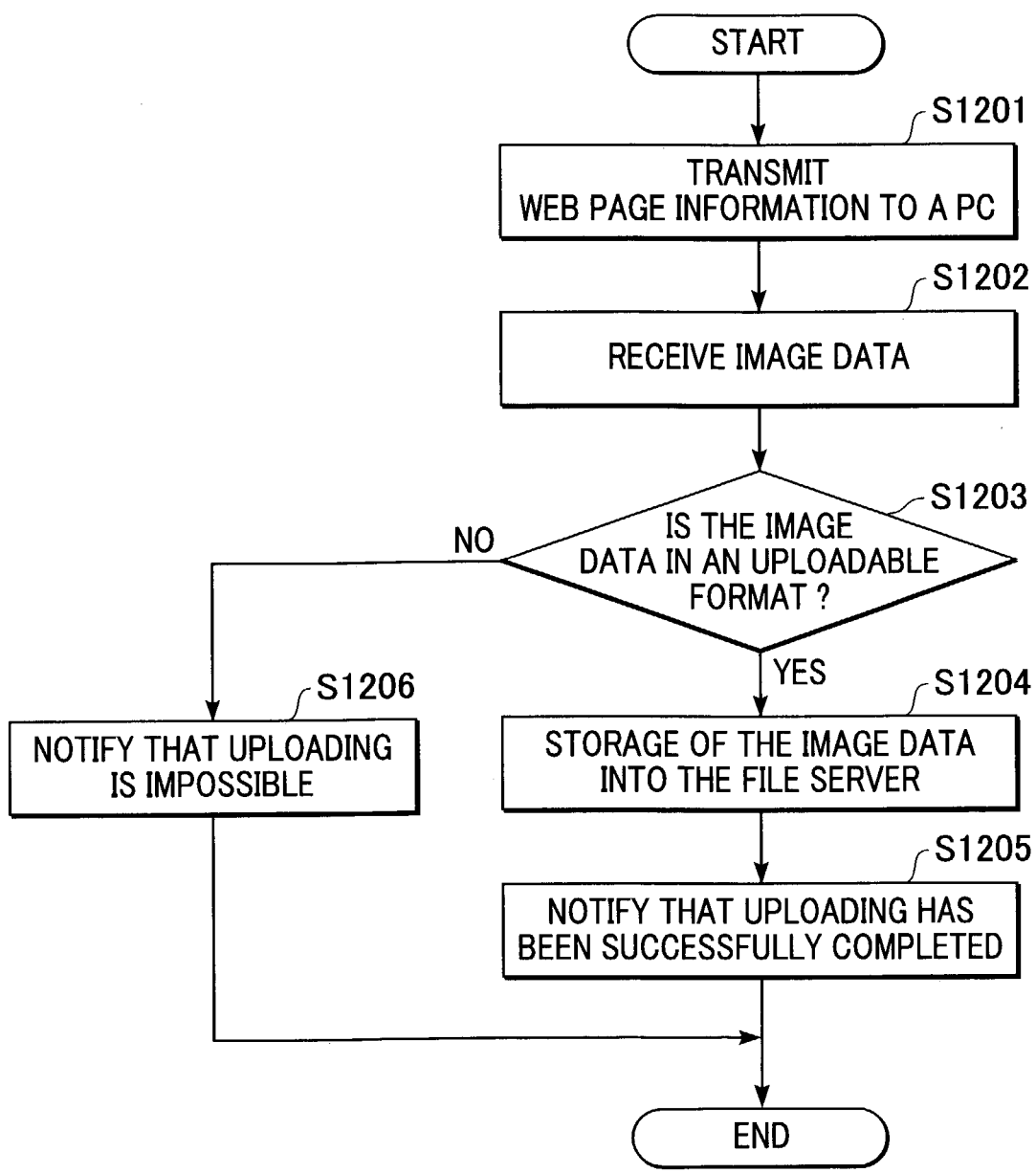
FIG. 12 is a flow chart showing a process of uploading image data to the photo site according to an embodiment of the present invention.

Referring to a flow chart shown in FIG. 12, a process performed by the photo site 105 to upload image data from a user's PC 102A to the file server 209 is described below.

Herein it is assumed that the image data transferred from the user's PC 102A to the photo site 105 is that transferred from the image input apparatus 101 to the user's PC 102A. Transferring of image data from the image input apparatus 101 to the user's PC 102A may be performed in such a manner that all image data stored in a storage device disposed in the image input apparatus 101 are transferred at a time in response to a command issued by the OS or dedicated software installed on the user's PC 102A or in such a manner that, in response to a transfer command issued by the image input apparatus 101, the OS or dedicated software installed on the user's PC 102A allocate a data storage area in the storage device disposed in the user's PC 102A and transfers image data from the storage device of the image input apparatus 101 into the allocated data storage area.

Step S1201: The PC application server 203 transfers, to the user's PC 102A, Web page information for displaying, on the browser running on the user's PC 102A, a screen for providing various services to the user, wherein the Web page information is described in a page description language such as Hyper Text Markup Language (HTML) or extensible Markup Language (XML). This allows the photo site 105 to start providing upload service of image data via the Internet 104 to the user of the PC 102A.

Step S1202: The PC application server 203 receives the image data from the user's PC 102A via the Internet 104.

In this step, image data may be transferred from the user's PC 102A to the PC application server 203 in such a manner that image data is selected on a Web page displayed on a browser running on the user's PC 102A and the selected image data is transferred to the PC application server 203, or in such a manner that image data is selected using dedicated software installed on the user's PC 102A and the selected image data is transferred to the PC application server 203. In any case, the transfer is performed using a protocol such as http or ftp (File Transfer Protocol) which is allowed to be used on the Internet 104.

Step S1203: The PC application server 203 determines whether the image data received in step S1202 is in an allowed (uploadable) format.

Step S1204: If it is determined in S1203 that the image data is in an allowed (uploadable) format, the PC application server 203 transfers the image data received in step S1202 to the file server 209, which stores the received image data. The PC application server 203 stores, in a relational fashion, attribute information such as the image data ID of the image data stored in step S1204 and the user ID of the user into database tables of the DB server 208.

In the above process, the file server 209 stores the image data in the form of an album in which a plurality of image data are archived.

Step S1205: The PC application server 203 informs the user's PC 102A that the image data has been successfully uploaded. This makes it possible for the user to access the photo site 105 via the browser running on the user's PC 102A to view the album stored in the file server 209 of the photo site 105.

The user can also request the photo site 105 to print the album stored in the file server 209, by performing a necessary operation in accordance with information included in the Web page displayed on the browser running on the user's PC 102A. In response to receiving the print request from the user's PC 102A, the photo site 105 transmits, to the print site 109, a print command together with the image data to be printed.

Step S1206: In a case in which it is determined in S1203 that the image data is not in any allowed (uploadable) format, the PC application server 203 of the photo site 105 informs the user's PC 102A that the image data cannot be uploaded.

Process Performed by Photo Site to Provide an Album to a User

Figure 14:
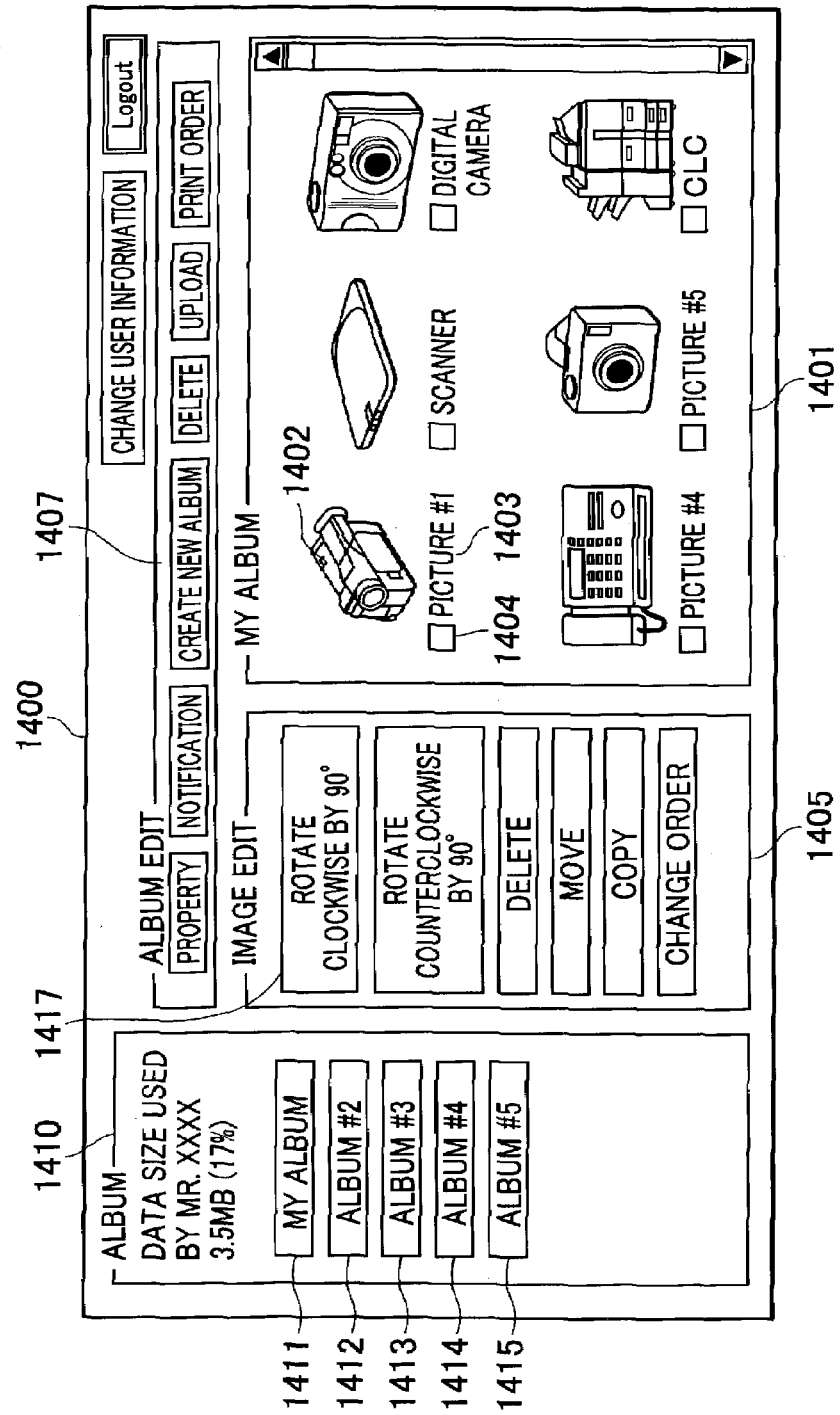
FIG. 14 is a diagram showing an example of a screen including album information which allows users to view image data uploaded on the photo site according to an embodiment of the present invention.

If the user's PC 102A accesses the photo site 105 via the Internet 104, an album viewing screen 1400 such as that shown in FIG. 14 is displayed on the browser. FIG. 14 shows the album viewing screen 1400 displayed on the user's PC 102A. The album viewing screen 1400 includes thumbnail images 1402 in an image display area 1401, image names 1403, check boxes 1404 used to select image data, an image edit area 1405 including various buttons used in editing images in the album, and an album selection area 1410 for selecting a user's album. In a case in which no album is selected, an album having a first value of the album number 503 is displayed as default in the image display area 1401. In this case, if the user selects an album by pressing one of album selection buttons 1411 to 1415 in the album selection area 1410 displayed on the PC 102A, an album view request for viewing the selected album is transmitted to the photo site 105.

Figure 13:
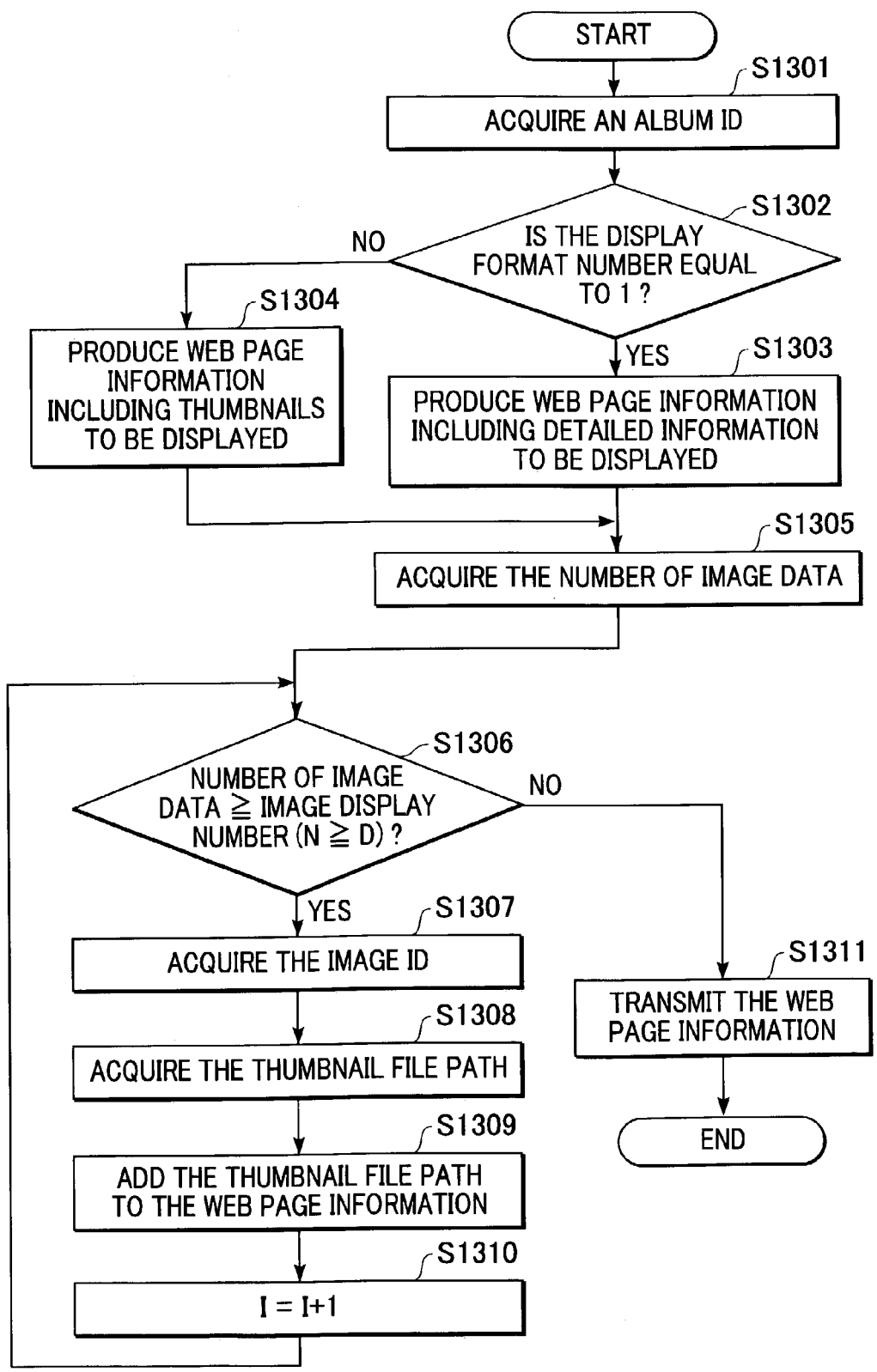
FIG. 13 is a flow chart showing a process performed by the photo site, according to an embodiment of the present invention, to provide uploaded image data to users.

If the photo site 105 receives the album view request from the user, the photo site 105 provides the requested album to the user as described below with reference to FIG. 13.

Step S1301: The PC application server 203 detects the number of the album selection button selected on the user's PC 102A and acquires an album ID 502 corresponding to the detected number of the album selection button on the basis of an album number 503 described in the custom album data table 500.

Step S1302: The PC application server 203 determines whether the display format number 609 is equal to "1", on the basis of the album ID 502 acquired in step S1301 and the album ID 601 described in the album information data table 600.

Step S1303: If it is determined in step S1302 that the display format number 609 is equal to "1", the PC application server 203 produces Web page information including, as shown in FIG. 15, detailed information about the image data and thumbnail images to be displayed.

In the example shown in FIG. 15, detailed information displayed in the image display area 1501 includes image names 1502 acquired from the image information data table 800, comments 1503, the number of times images have been viewed 1504, the numbers of prints 1505, and check boxes 1506 for selecting an image. The screen 1500 for displaying detailed information about albums is similar to the album viewing screen 1400 except for the manner in which images are displayed in the image display area 1401, and thus a further detailed description of the screen 1500 is not given herein.

Step S1304: In a case in which it is determined in step S1302 that the display format number 609 is not equal to "1", the display format number 609 is regarded as "0", and thus the PC application server 203 produces Web page information for displaying the album viewing screen 1400.

Step S1305: The PC application server 203 detects the number of data 704 described in the album image data table 700, on the basis of the album ID 502 acquired in step S1301. The PC application server 203 then sets the number of image data N to be equal to the number of image data 704 and sets the image display number I to "1".

Step S1306: The PC application server determines whether $N \geq I$.

Step S1307: If it is determined in step S1306 that $N \geq I$, the PC application server 203 acquires the image ID 702 described in the album image data table 700 on the basis of the album ID 502 acquired in step S1301 and the image display number I.

Step S1308: The PC application server 203 acquires the thumbnail file path 805 described in the image information data table 800 on the basis of the image ID 702 acquired in step S1307.

Step S1309: The PC application server 203 describes the thumbnail file path 805 acquired in step S1308 in the Web page information produced in step S1303 or S1304.

Step S1310: The PC application server 203 increments the image display number I by one.

Step S1311: In a case in which it was determined in step S1303 that N<I, the PC application server 203 determines that thumbnail file paths 805 of all image data included in the album have been added to the Web page information and the PC application server 203 transmits the Web page information to the PC 102A.

Although in the embodiment described above, the display formats include the thumbnail format and the detailed information display format, the display formats are not limited to those.

Process Performed by the Photo Site to Release an Album to Third Persons

Figure 16:
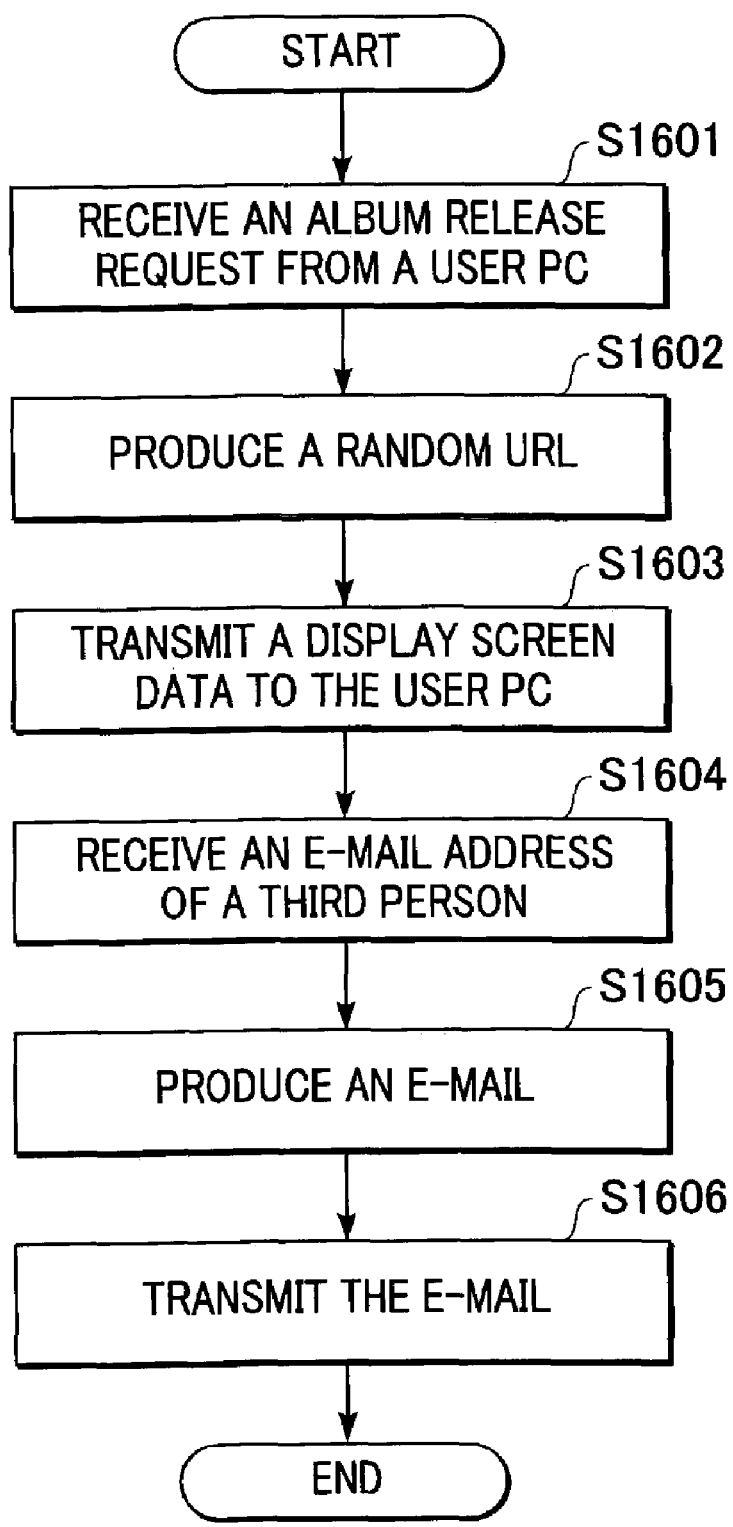
FIG. 16 is a flow chart showing a process performed by the photo site, according to an embodiment of the present invention, to inform third persons that an album has been released.

A process performed by the photo site 105 to release a user's album uploaded to the file server 209 to third persons is described below with reference to FIG. 16.

Step S1601: If the load balancer 202 receives, from a user's PC 102A, a request for release of an album to third persons, the load balancer 202 transfers the album release request to the PC application server 203. Note that the album release request includes information specifying the album to be released.

Step S1602: The PC application server 203 produces a universal resource locator (URL) at which the album specified in the album release request received in step S1601 is to be released.

The URL refers to a unique address assigned to the album. The URL is set, by using, for example, a random number, to a value which cannot be easily guessed. (Hereinafter, such a URL which cannot be easily guessed will be referred to as a random URL.) An example of a URL is described below:

http://xxx.com/PhotoSite/Album/
AlbumEntry.cgi?AlbumID=AJNWDMF

Step S1603: The PC application server 203 transmits an album release notification screen in the form of Web page information, such as that shown in FIG. 17, used to input various data including data specifying an e-mail address of a third person, to the user's PC 102A.

The album release notification screen 1700 shown in FIG. 17 is described in further detail below. The album release notification screen 1700 includes a receiver's mail address field 1702 for inputting an e-mail address of a third person, a sender's mail address field 1703 for inputting an e-mail address of the user, a mail title field 1704 for inputting a subject of the e-mail, and a message field 1705 for inputting a message to be described in the email. The album release notification screen 1700 also includes a URL field 1708 and an album ID field 1709, wherein the random URL produced in step S1602 is displayed in the URL field 1708, and the album ID of the album to be released is displayed in the album ID field 1709.

Step S1604: The PC application server 203 receives the information, including various data such as that indicating the e-mail address of the third person, from the user's PC 102A.

Step S1605: The PC application server 203 of the photo site 105 produces, as shown in FIG. 18, an e-mail 1800 in which the random URL produced in step S1602 is described.

The e-mail 1800 shown in FIG. 18 is described in further detail below. In the URL field 1801 and the album ID field 1802 of the e-mail 1800, the same data as the data described in the URL field 1708 and the data described in the album ID field 1709 of the album release notification screen 1700 are described.

In a case in which a password is needed when a third person views the album, information associated with the password is described in the e-mail 1800.

Step S1606: The PC application server 203 transfers the e-mail 1800 produced in step S1605 to the mail server 206, which in turn transmits the e-mail 1800 to the e-mail address, notified in step S1604, of the third person.

In step S1606, if the third person's e-mail address is that of a portable communication terminal 113, the e-mail is transmitted from the mail server 206 to the mobile communication network 114B via the Internet 104 and the Internet connection gateway 115B and finally transmitted to the third person's portable communication terminal 113B.

If the third person receives the e-mail indicating that the album of the user has been released, the third person may transmit a request to the photo site 105 for providing the album. More specifically, if the third person, who has received the e-mail 1800 by the third person's portable communication terminal 113B, activates a browser on the third person's portable communication terminal 113B and inputs the random URL described in the e-mail 1800, an album view request is transmitted to the photo site 105 via the mobile communication network 114B, the Internet connection gateway 115, and the Internet 104. On the other hand, a third person who has received the e-mail 1800 by a third person's PC 102B may transmit an album view request to the photo site 105 via the Internet 104 by activating a browser on the third person's PC 102B and inputting the random URL described in the e-mail 1800. The random URL used by the third person's PC 102B and that used by the portable communication terminal 113B are identical to each other.

Figure 19A:
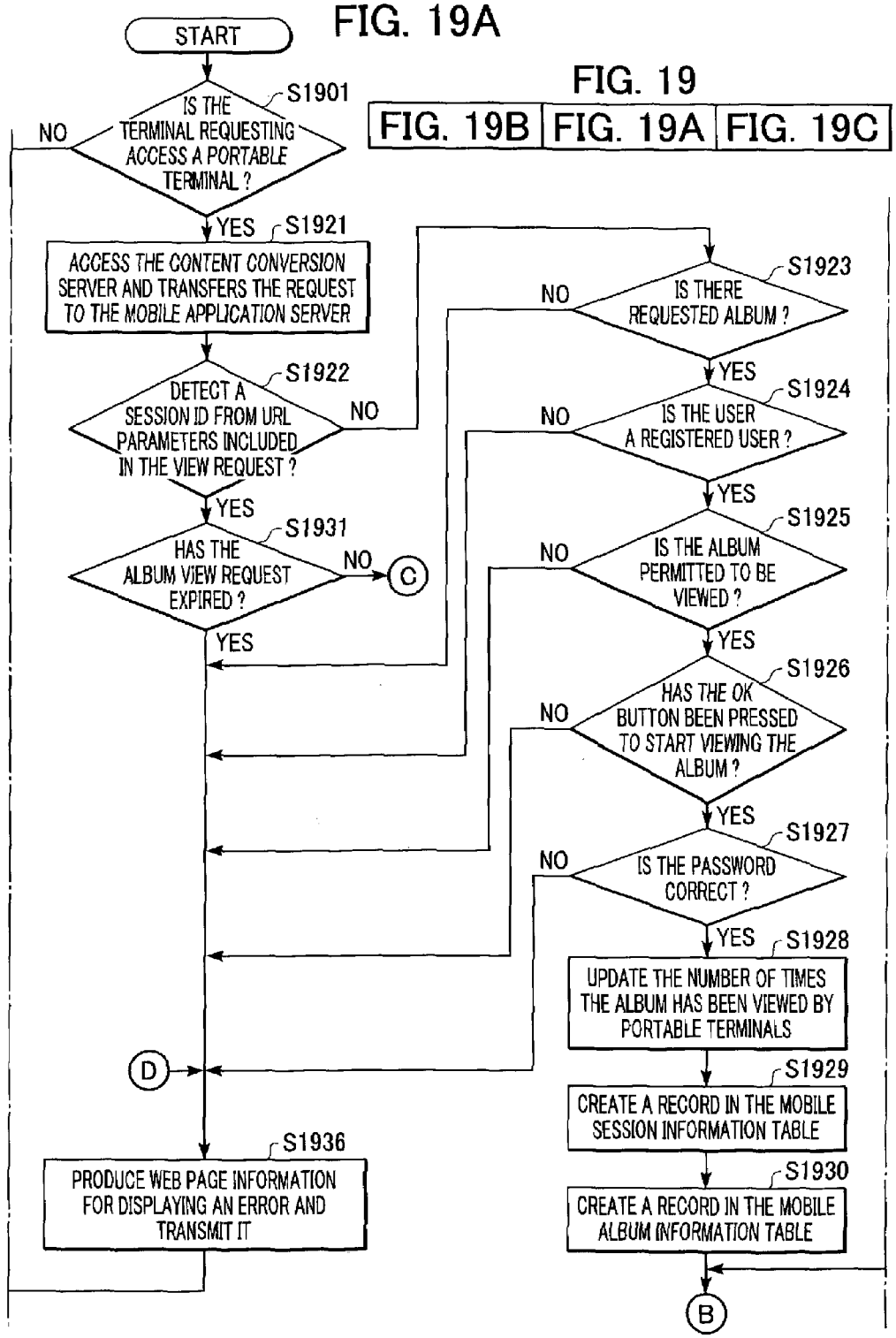
FIG. 19 is a flow chart showing a process performed by the photo site to provide an album to a third person, according to an embodiment of the present invention.
Figure 19B:
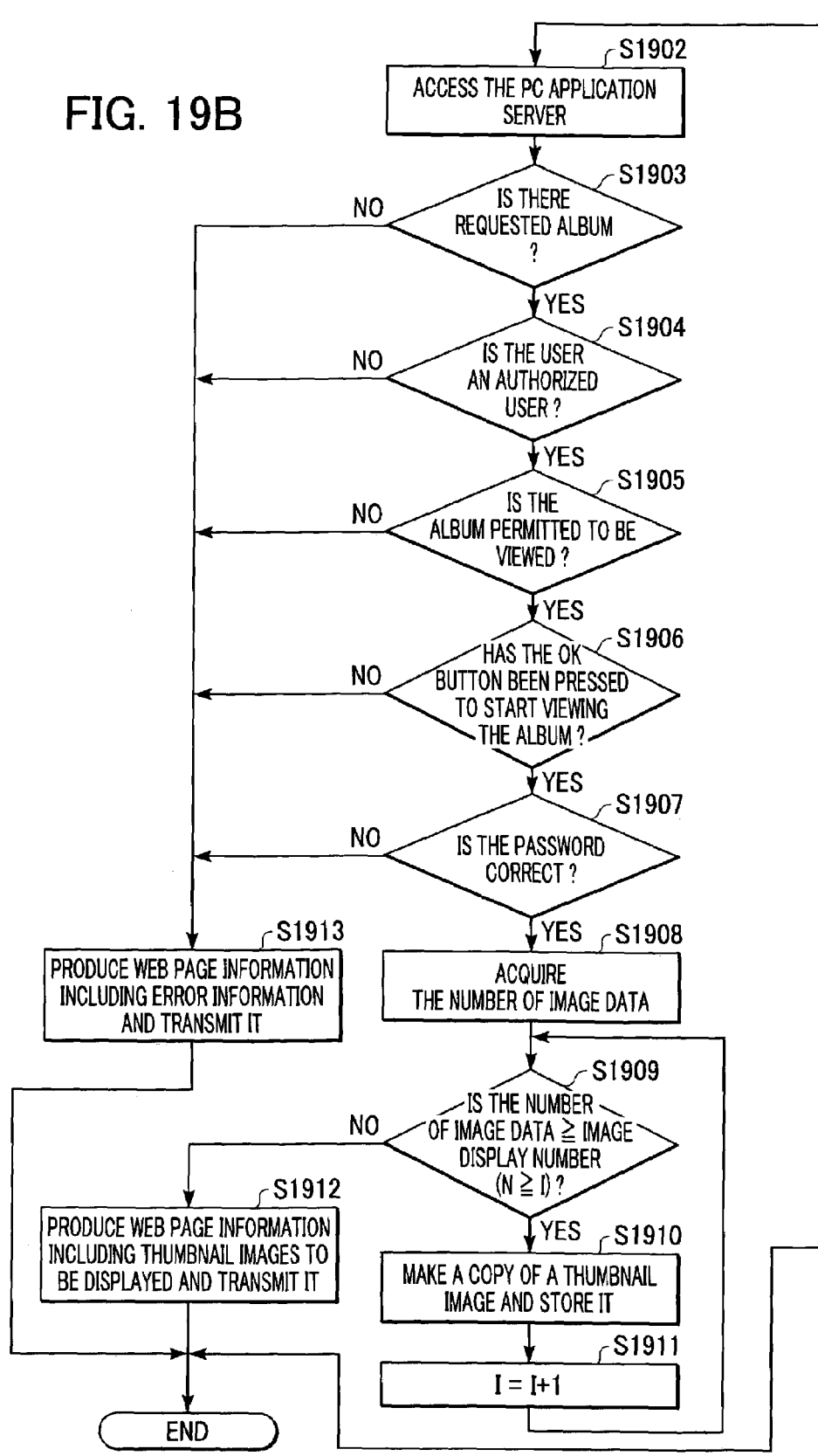
Figure 19C:
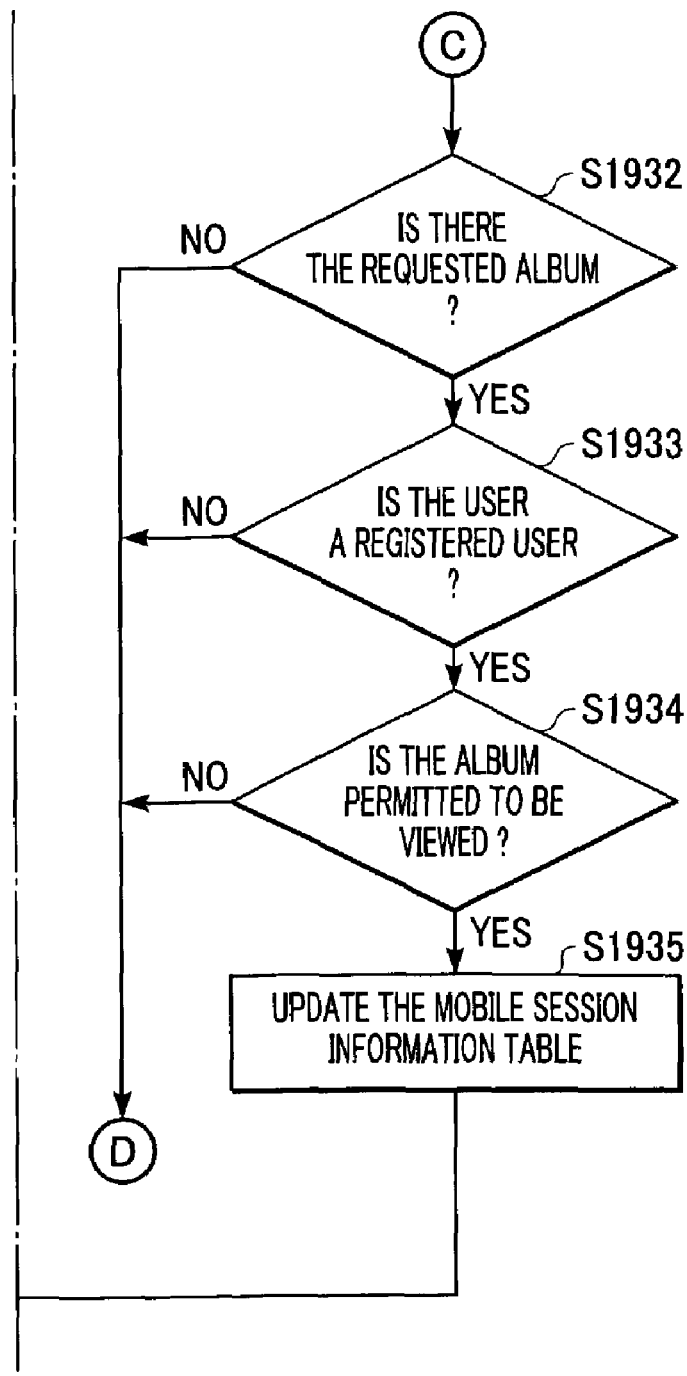

Process Performed by the Photo Site to Provide an Album of a User to a Third Person A process performed by the photo site 105, in response to receiving an album view request from a third person, to provide an album to the third person is described below with reference to a flow chart shown in FIG. 19.

Step S1901: The load balancer 202 determines whether a terminal from which an album view request has been received is a portable communication terminal 113. More specifically, the load balancer 202 determines whether the type of the terminal is a portable communication terminal by examining the value described in the user-agent field included in the http request header of the album view request received from the terminal. Alternatively, the load balancer 202 may store in advance patterns of character strings included in cookie information and may determine whether the type of the terminal is a portable communication terminal 113 on the basis of a character string included in cookie information received from the terminal which has issued the album view request.

Step S1902: If it is determined in step S1901 that the terminal which has issued the album view request is not a portable communication terminal 113, the load balancer 202 determines that the type of the terminal is a PC 102. In this case, the load balance 202 transfers the album view request to the PC application server 203.

Step S1903: The PC application server 203 extracts the album ID from the URL parameters input by the PC 102 which has issued the album view request and determines whether the extracted album ID is included in the album IDs 502 described in the customer album data table 500. If it is determined in step S1903 that the album ID is not included in the IDs 502, the PC application server 203 determines that the corresponding album has been deleted from the file server 209. In this case, the process jumps to step S1913 in which the PC application server 203 produces Web page information for displaying an error screen on a browser on the PC 102 and transmits the produced Web page information to the PC 102 which issued the album view request.

Step S1904: On the other hand, if it determined in step S1903 that the album ID is included in the album IDs 502, the PC application server 203 further determines whether the corresponding user ID 501 described in the customer album data table 500 is included in the user IDs 401 described in the customer information data table 400. If it is determined in step S1904 that the user ID 501 is not included in the user IDs 401, the PC application server 203 determines that the corresponding user has lost the membership of the photo site 105. In this case, the process jumps to step S1913.

Step S1905: If it is determined in step S1904 that the user ID 501 is included in the user IDs 401, the PC application server 203 determines whether the user is a member (authorized member) of the photo site 105. In this case, the PC application server 203 further determines whether the provide allowance 604 described in the album information data table 600 indicates that providing of the album is allowed. If it is determined in step S1905 that the album is not allowed to be provided to third persons, the PC application server 203 jumps the process to step S1913.

The corresponding user registration status 401 described in the customer information data table 400 may be checked to determine whether it is set to "1" which indicates that the user is allowed to receive service from the photo site 105, and step S1905 may be performed if the user registration status 401 is set to "1". If it is determined that the user registration status

401 is not set to "1", the user is not allowed to receive service from the photo site 105, and thus the process jumps to step S1913.

Step S1906: If it is determined in step S1905 that the album is allowed to be provided to third persons, the PC application server 203 produces Web page information for displaying a screen 2000, such as that shown in FIG. 20, and transmits the produced Web page information to the PC 102 which issued the album view request. The PC application server 203 stores then determines whether the OK button 2001 is pressed on the PC 102.

Figure 20:
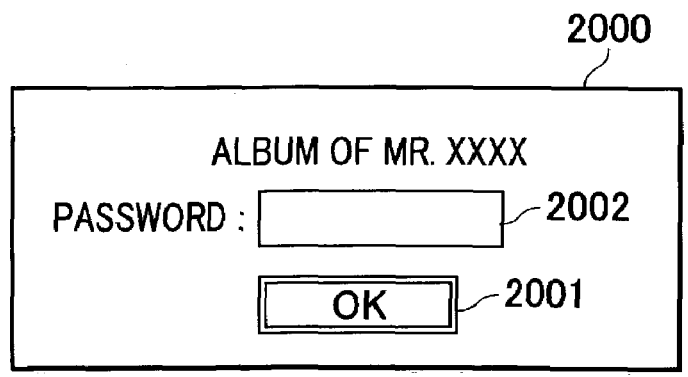
FIG. 20 is a diagram showing an example of a screen, displayed on a browser running on a PC, for requesting a particular album, according to an embodiment of the present invention.

The screen 2000 shown in FIG. 20 includes a user's last name field 405 in which the user's last name is displayed. In the case in which the password necessity flag 605 indicates that a password is needed, the screen 2000 includes a password input field 2002. If the password necessity flag 605 indicates that no password is necessary, the password input field 2002 is not displayed.

Step S1907: If it is determined in step S1906 that the OK button 2001 has been pressed, the PC application server 203 further determines whether the password input in the password input field 2002 is identical to the album password 606. If it is determined in step S1907 that the password is invalid, the PC application server 203 jumps the process to step S1913. In the case in which the password necessity flag 605 indicates that no password is necessary, step S1907 is skipped.

Step S1908: If it is determined in step S1907 that the password is correct, or if a password is not needed and S1907 is skipped, the PC application server 203 acquires the number of image data 704 described in the album image data table 700 on the basis of the album ID extracted from the URL parameters and sets the acquired number into the number of image data N. The PC application server 203 also sets the image display number I to 1. Furthermore, the PC application server 203 increments, by one, the number of times viewed 611 described in the album image data table 600 on the basis of the album ID extracted from the URL parameters.

Step S1909: The PC application server 203 determines whether the number of image data (N)≧the image display number (I).

Step S1910: If it is determined in step S1909 that N≧I, the PC application server 203 acquires the image ID 702 described in the album image data table 700 on the basis of the album ID extracted from the URL parameters and the image display number I. Furthermore, the PC application server 203 detects the thumbnail file path 805 described in the image information data table 800 on the basis of the image ID 702 and accesses the thumbnail image stored in the file server 209. The PC application server 203 makes a copy of the thumbnail image and stores it into a temporary area in the file server 209, dedicated to use by the PC application server 203. The PC application server 203 then increments, by one, the number of times viewed 808 described in the image information data table 800 on the basis of the image ID 702.

Step S1911: The PC application server 203 increments the image display number I by one with the process returning to step S1909. If N<I in S1909, the process proceeds to S1912.

Step S1912: The PC application server 203 produces Web page information for displaying a screen such as that shown in FIG. 21 on the PC 102 and transmits the produced Web page information to the PC 102 which issued the album view request. In this step, the Web information page is produced using a page description language, such as HTML or XML, which is allowed to be used by the browser running on the PC 102.

Figure 21:
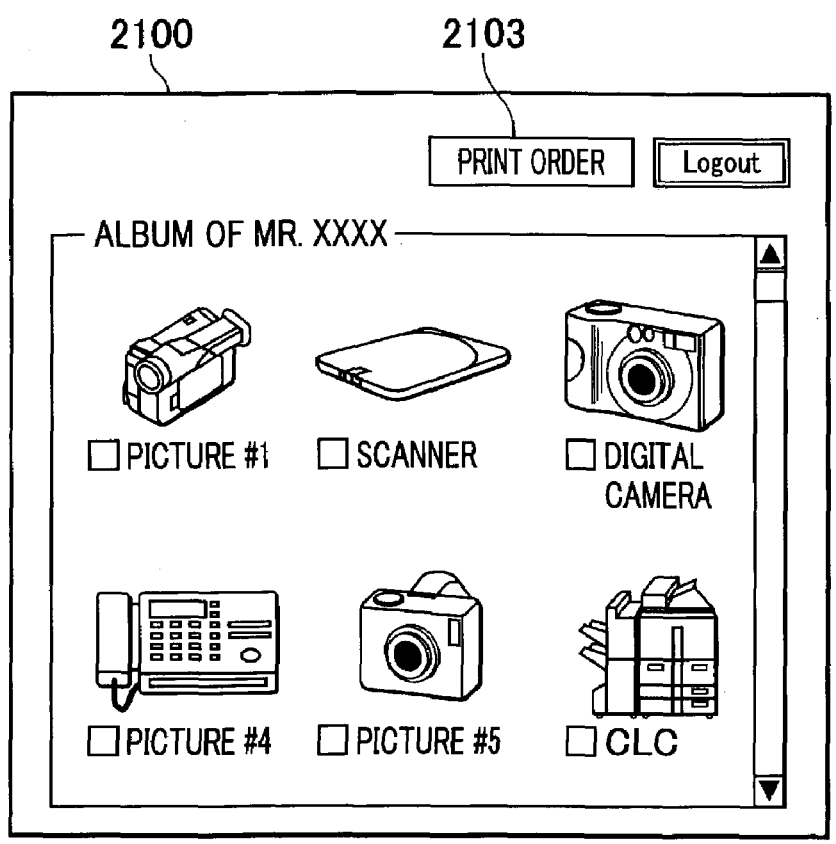
FIG. 21 is a diagram showing an example of a screen, displayed on a browser running on a PC, for use by a third person to select an album to be viewed, according to an embodiment of the present invention.

In the screen shown in FIG. 21, if the print allowance flag 607 set in the album information data table 600 indicates that printing is allowed, a print order button 2103 is displayed. If the print order button 2103 is selected on the PC 102 which issued the album view request, the PC application server 203 issues a print order for the album.

Step S1921: If it is determined in step S1901 that the type of the terminal which issued the album view request is a portable communication terminal 113, the load balancer 202 transfers the album view request to the content conversion server 205. In accordance with the detected device type of the portable communication terminal 113, the content conversion server 205 converts the album view request and transfers the resultant album view request to the mobile application server 204.

Step S1922: The mobile application server 204 determines whether a session ID can be extracted from the URL parameters included in the album view request transferred in step S1921.

Step S1923: If it is determined in step S1922 that the session ID cannot be extracted, the mobile application server 204 determines that the album view request is new and the process proceeds to S1923. In this case, the mobile application server 204 extracts the album ID from the URL parameters and determines whether the extracted album ID is included in the album IDs 502 described in the customer album data table 500.

If it is determined in step S1923 that the extracted album ID is not included in the album IDs 502, the mobile application server 204 determines that the corresponding album has been deleted from the file server 209. In this case, the process jumps to step S1936 in which the mobile application server 204 produces Web page information for displaying an error screen on a browser on the portable communication terminal 113 and transmits the produced Web page information, via the content conversion server 205, to the portable communication terminal 113 which issued the album view request.

Step S1924: If it is determined in step S1923 that the extracted album ID is included in the album IDs 502, it is further determined whether the user ID 501 is included in the user IDs 401 described in the customer information data table 400. If it is determined in step S1924 that the user ID 501 is not included in the user IDs 401, the mobile application server 204 determines that the user has lost the membership of the photo site 105. In this case, the process jumps to step S1936. Otherwise, the process proceeds to S1925.

Step S1925: If it is determined in step S1924 that the user ID 501 is included in the user IDs 401, the mobile application server 204 further determines, on the basis of the album ID extracted from the URL parameters, whether the provide allowance flag 604 set in the album information data table 600 indicates that providing of the album to third persons is allowed. If it is determined in step S1925 that the album is not allowed to be provided to third persons, the mobile application server 204 jumps the process to step S1936.

The corresponding user registration status 401 described in the customer information data table 400 may be checked to determine whether it is set to "1" which indicates that the user is allowed to receive service from the photo site 105, and step S1925 may be performed if the user registration status 401 is set to "1". If it is determined that the user registration status 401 is not set to "1", the user is not allowed to receive service from the photo site 105, and thus the process jumps to step S1936.

Figure 22:
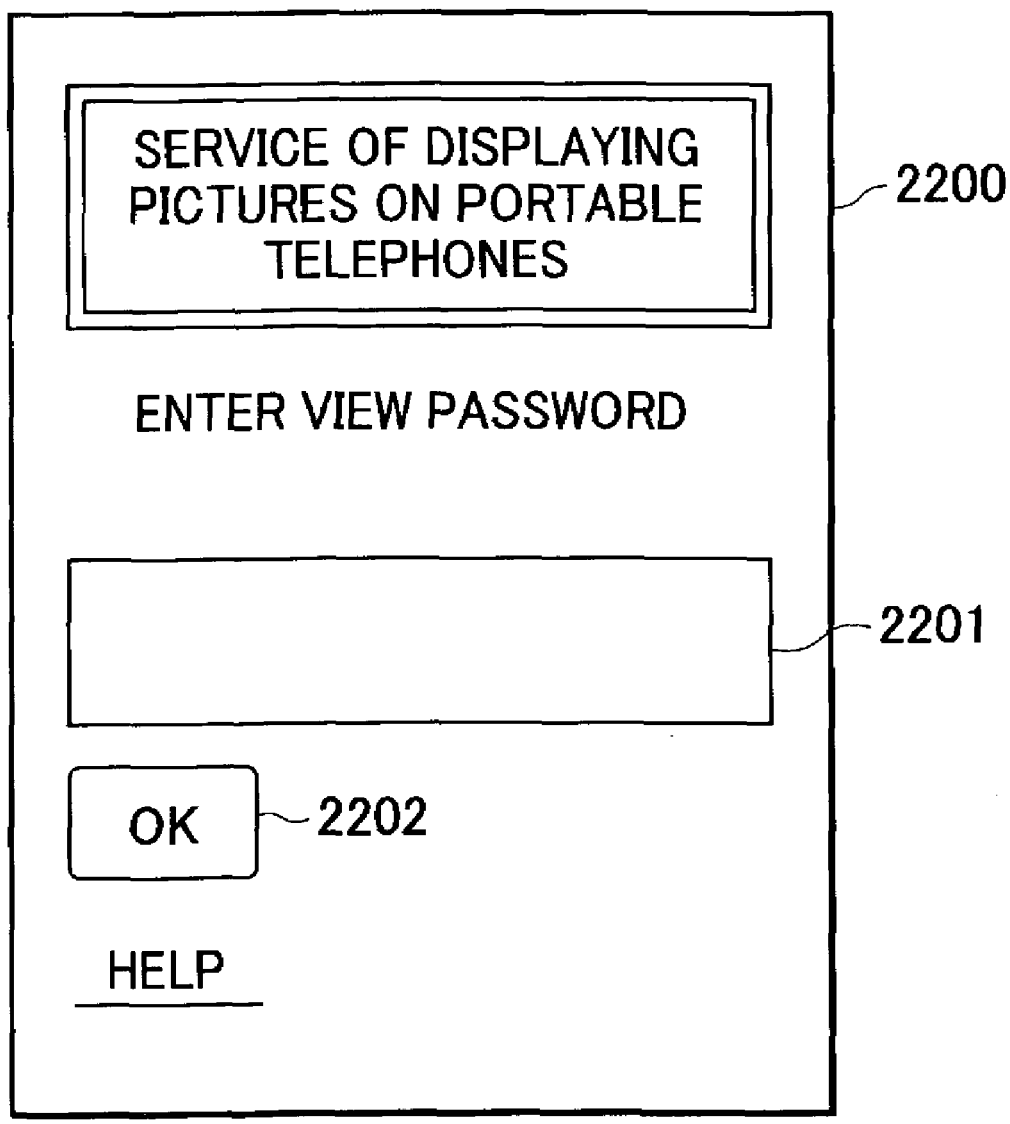
FIG. 22 is a diagram showing an example of a screen, displayed on a browser running on a portable communication terminal, for requesting a particular album, according to an embodiment of the present invention.

Step S1926: If it is determined in step S1925 that the album is allowed to be provided to third persons, the mobile application server 204 produces Web page information for displaying a screen 2200 such as that shown in FIG. 22 and transmits it to the content conversion server 205. Depending on the device type detected for the portable communication terminal 113 which issued the album view request, the content conversion server 205 converts the received Web page information and transmits it to the portable communication terminal 113. The mobile application server 204 then determines whether the OK button 2201 is pressed on the portable communication terminal 113.

In the screen 2200, if the password necessity flag 605 is set to indicate that a password is needed, a password input field 2201 is displayed. However, if the password necessity flag 605 indicates that no password is necessary, the password input field 2201 is not displayed.

Step S1927: If it is determined in step S1926 that the OK button has been pressed, the content conversion server 205 receives a value input into the password input field 2201 and transfers it to mobile application server 204 after properly converting it. The mobile application server 204 determines whether the value received from the content conversion server 205 is identical to the corresponding album password 606 described in the album information data table 600.

If it is determined in step S1927 that the value received from the content conversion server 205 is not identical to the corresponding album password 606, the mobile application server 204 jumps the process to step S1936.

In the case in which the password necessity flag 605 indicates that no password is necessary, step S1927 is skipped.

Step S1928: If it is determined in step S1927 that the value received from the content conversion server 205 is identical to the album password 606, the mobile application server 204 increments, by one, the number of times viewed 612 described in the album information data table 600.

Step S1929: The mobile application server 204 issues a session ID to the album view request and creates a new record in the mobile session information table 900. The mobile application server 204 then sets the current date/time into the last access date/time field 902 and also into the access date/time field 903. Furthermore, the mobile application server 204 sets the user ID 502 into the user ID field 904 and sets an initial value into the record attribute field 905.

Figure 23:
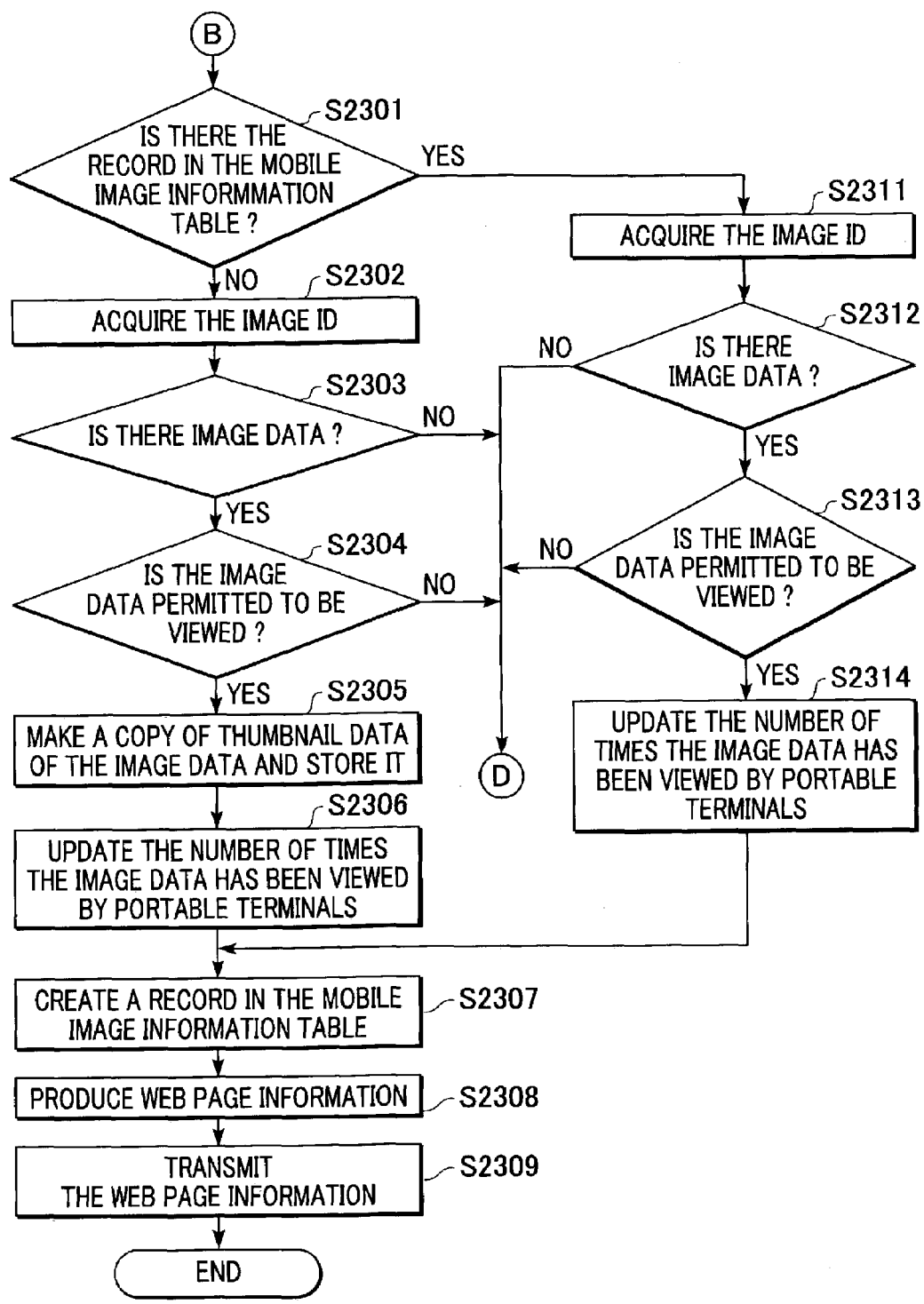
FIG. 23 is a flow chart showing a process performed by a photo site to provide an album to a portable communication terminal, according to an embodiment of the present invention.

Step S1930: The mobile application server 204 then creates a new record in the mobile album information table 1000 and sets the session ID issued in step S1929 into the session ID field 1101 and the album ID extracted from the URL parameters into the album ID field 1102. Furthermore, on the basis of the album ID 1102, the mobile application server 204 fills the album name field 1003 and the album comment field 1004 with data identical to those described in the album information data table 600. Thereafter, the mobile application server 204 performs a process as shown in FIG. 23.

Step S1931: If it is determined in step S1922 that the session ID can be extracted, then, on the basis of the session ID 901 described in the mobile session information table 900, the mobile application server 204 compares the last access date/time 902 with the current date/time to determine whether the album view request has expired. If it is determined in step S1931 that the album view request has expired, the mobile application server 204 jumps the process to step S1936. This prevents an unauthorized access, which may otherwise be performed by a third person using a URL obtained in access performed in the past via the portable communication terminal 113.

Step S1932: If it is determined in step S1931 that the album view request has not expired yet, the mobile application server 204 extracts the album ID from the URL parameters and searches the customer album data table 500 to determine whether the extracted album ID is included in the album IDs 502.

If it is determined in step S1932 that the album ID extracted from the URL parameters is not included in the album IDs 502 described in the customer album data table 500, the mobile application server 204 determines that the corresponding album has been deleted from the file server 209. In this case, the process jumps to step S1936.

Step S1933: If it is determined in step S1932 that the album ID extracted from the URL parameters is included in the album IDs 502 described in the customer album data table 500, it is further determined whether the user ID 501 is included in the user IDs 401 described in the customer information data table 400. If it is determined in step S1933 that the user ID 501 is not included in the user IDs 401 descried in the customer information data table 400, the mobile application server 204 determines that the user has lost the membership of the photo site 105. In this case, the process jumps to step S1936.

Step S1934: If it is determined in step S1933 that the user ID 501 is included in the user IDs 401 descried in the customer information data table 400, the mobile application server 204 further determines, on the basis of the album ID extracted from the URL parameters, whether the provide allowance flag 604 set in the album information data table 600 indicates that providing of the album to third persons is allowed. If it is determined in step S1934 that the album is not allowed to be provided to third persons, the mobile application server 204 jumps the process to step S1936.

The corresponding user registration status 401 described in the customer information data table 400 may be checked to determine whether it is set to "1", which indicates that the user is allowed to receive service from the photo site 105, and step S1934 may be performed if the user registration status 401 is set to "1". If it is determined that the user registration status 401 is not set to "1", the user is not allowed to receive service from the photo site 105, and thus the process jumps to step S1936.

Step S1935: If it is determined in step S1934 that the album is allowed to be provided to third persons, the mobile application server 204 sets, on the basis of the session ID extracted from the URL parameters, the current date/time into the last access date/time field 902 of the mobile session in formation table 900. Thereafter, the mobile application server 204 performs a process as shown in FIG. 23.

The process shown in FIG. 23 is performed by the mobile application server 204 as follows.

Step S2301: The mobile application server 204 determines whether the mobile image information table 1100 includes a record having a session ID identical to the session ID extracted from the URL parameters. In the case in which the session ID cannot be extracted from the URL parameters, the mobile application server 204 determines that there is not a corresponding record.

Step S2302: If it is determined in step S2301 that there is not a corresponding record in the mobile image information table 1100, the mobile application server 204 retrieves an image ID 702 of a record having an album ID identical to the album ID extracted from the URL parameters and having an image display number equal to "1" from the album image data table 700. Although in the present embodiment, "1" is employed as a default image number, another value may also be used.

Figure 24:
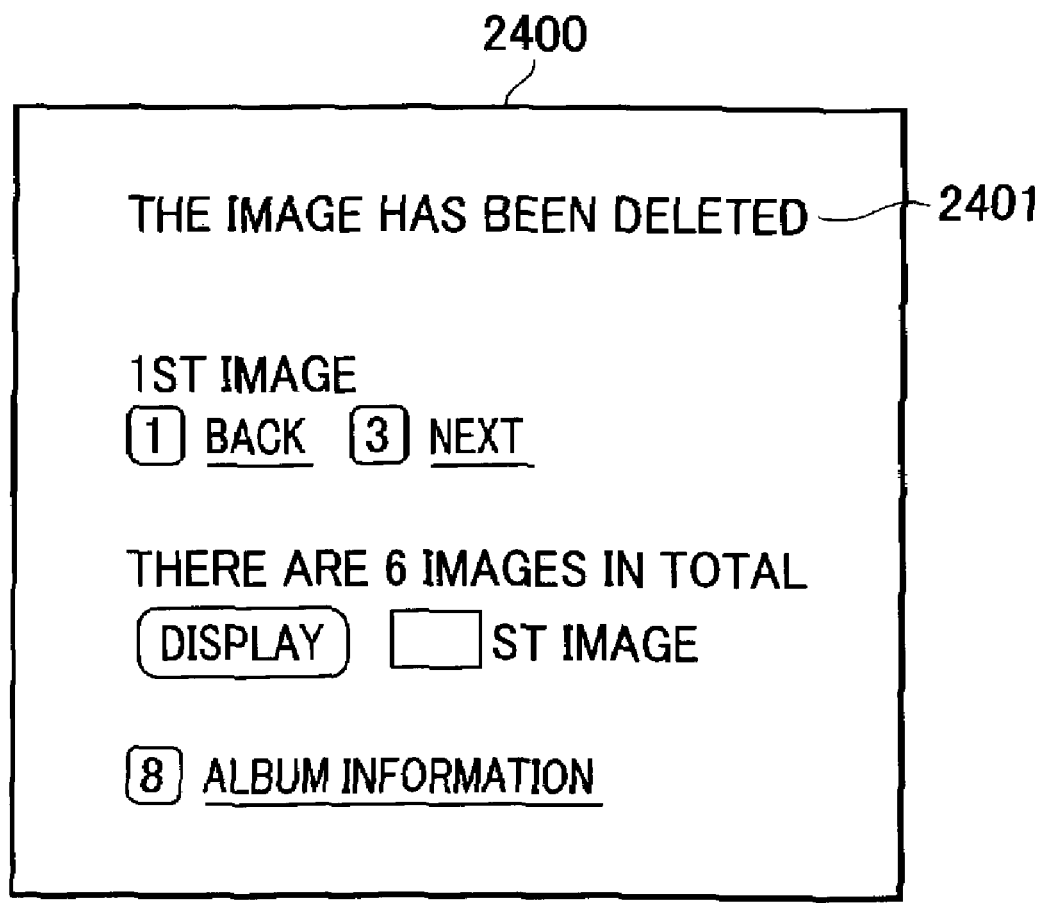
FIG. 24 is a diagram showing an example of a screen displayed on a browser running on a portable communication terminal to inform that an error has occurred, according to an embodiment of the present invention.

Step S2303: The mobile application server 204 determines whether the image ID 702 acquired in step S2302 is included in the image IDs 801 described in the image information data table 800. If it is determined in step S2303 that the image ID 702 is not included in the image IDs 801 described in the image information data table 800, the mobile application server 204 determines that the image data has been deleted. In this case, the process jumps to step S1936 shown in FIG. 19. In step S1936, a message "The image has been deleted." is displayed in the message field 2401 of the error screen 2400 as shown in FIG. 24.

Step S2304: If it is determined in step S2303 that the image ID 702 is included in the image IDs 801 described in the image information data table 800, the mobile application server 204 further determines whether the prohibition of viewing flag 811 is set to allow the image data to be viewed. If it is determined in step S2304 that the prohibition of viewing flag 811 is set to prohibit the image data from being viewed, the mobile application server 204 jumps the process to step S1936 shown in FIG. 19.

Step S2305: If it is determined in step S2304 that the prohibition of viewing flag 811 is set to allow the image data to be viewed, the mobile application server 204 accesses a thumbnail image stored in the file server 209 on the basis of the thumbnail image file path 805 and stores a copy of the thumbnail image into a temporary area in the file server 209, dedicated to use by the mobile application server 204.

Step S2306: The mobile application server 204 increments, by one, the number of times viewed 810 described in the image information data table 800.

Step S2307: The mobile application server 204 then creates a new record in the mobile image information table 1100 and sets the session ID of the present access into the session ID field 1101 and a file path of the thumbnail image stored in step S2305 into the image path field 1106. The mobile application server 204 fills the image ID field 1102, the album ID field 1103, the image name field 1104, the image comment field 1105, and the image number field 1107 with data identical to corresponding data described in the image information data table 800.

Step S2308: On the basis of information described in the mobile album information table 1000 and the mobile image information table 1100, the mobile application server 204 produces Web page information for displaying a mobile view screen, such as that shown in FIG. 25, on the browser on the portable communication terminal 113. In this step, the Web page information is produced using a page description language such as Wireless Markup Language (WML) or Compact HTML which can be used on the browser running on the portable communication terminal 113.

Figure 25:
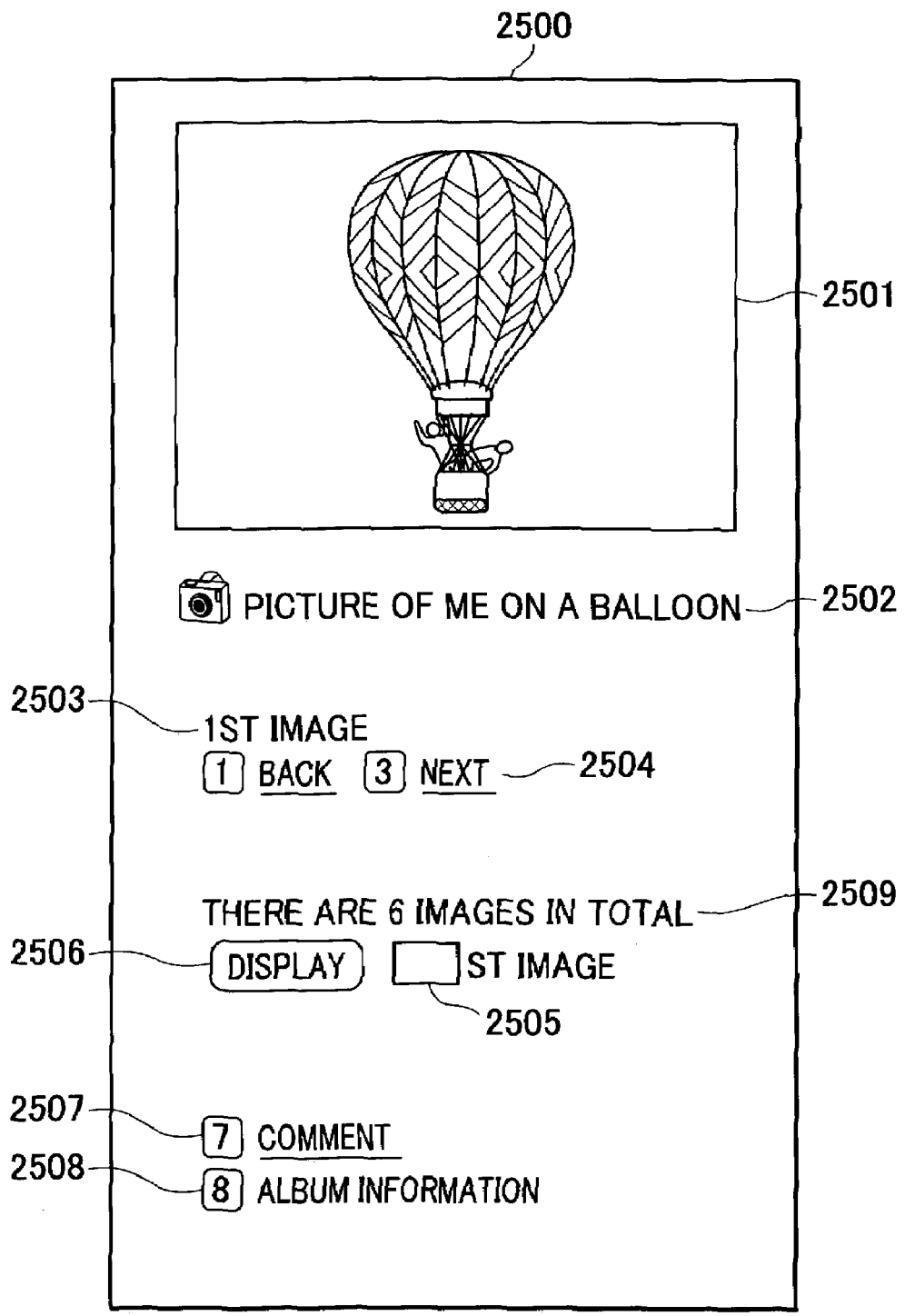
FIG. 25 is a diagram showing an example of a screen including a mobile album displayed on a browser running on a portable communication terminal, according to an embodiment of the present invention.

In the example shown in FIG. 25, the mobile album view screen 2500 includes a thumbnail image display area 2501 for displaying image data in the form of a thumbnail, an image data name field 2502, a display image number field 2503 indicating the position of the image data in the album, a link field 2504 for selecting image data to be displayed, an input field 2505 for inputting a display image number specifying image data to be displayed, a display button 2506 for issuing a command to display the specified image data, a link field 2507 for displaying a mobile image information screen 2600 which will be described later, a link field 2508 for displaying a mobile album information screen, and a number of image data field 2509 indicating the total number of image data included in the album.

For example, if the link field 2504 is clicked on the portable communication terminal 113 accessing the photo site 105, data including the session ID, the album ID, and the image number of the image data being currently displayed on the portable communication terminal 113, described in the URL parameters, is transmitted to the photo site 105. In response, the photo site 105 sequentially performs step S1901 and steps following that, shown in FIG. 19, to produce Web page information for displaying in the image display area 2501 a thumbnail mage of, image data having a displayed-image number immediately before or after the current displayed-image number and for displaying the image name of that image data in the image name field 2502.

On the other hand, if the an image number specifying an image to be displayed is input in the input field 2505 and the display button 2506 is pressed on the portable communication terminal 113, data including the session ID, the album ID, and the image number input on the portable communication terminal 113, described in the URL parameters, is transmitted to the photo site 105. In response, the photo site 105 sequentially performs step S1901 and steps following that, shown in FIG. 19, to produce Web page information for displaying in the image display area 2501 a thumbnail mage of image data having the specified image number and for displaying the image name of that image data in the image name field 2502.

Figure 26:
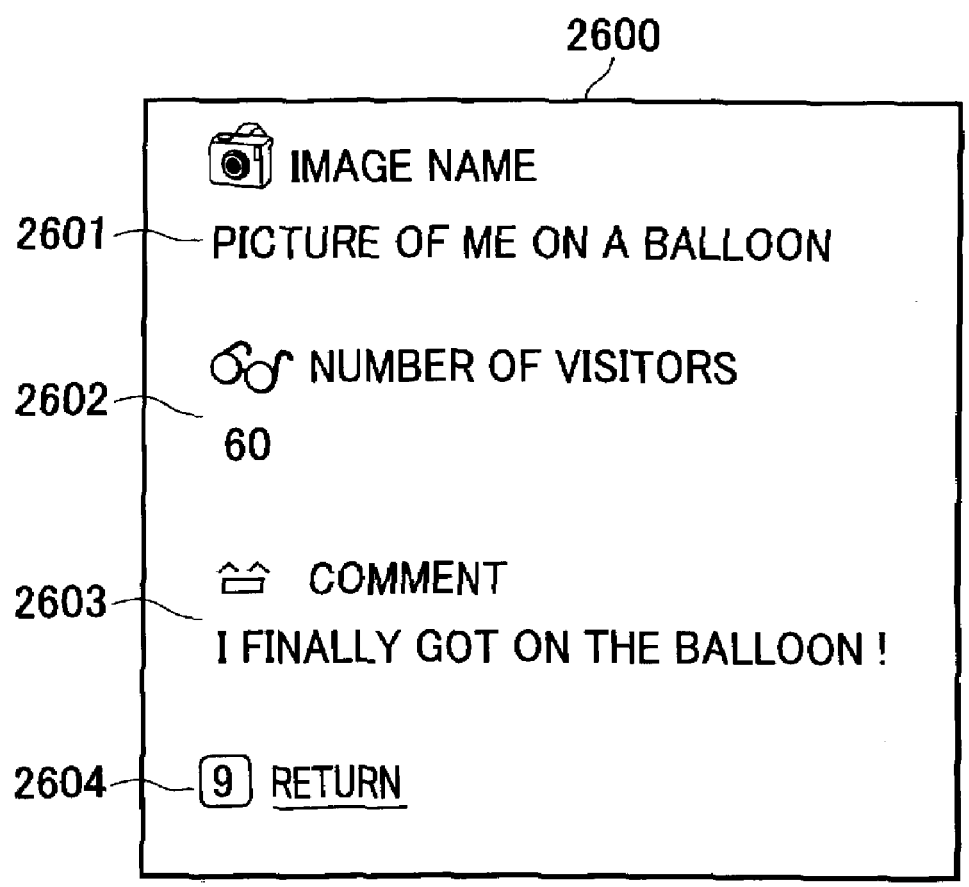
FIG. 26 is a diagram showing an example of a screen including mobile image information displayed on a browser running on a portable communication terminal, according to an embodiment of the present invention.

In the case in which the link field 2507 is pressed on the portable communication terminal 113, data including the session ID, the album ID, and a detailed image information request, described in the URL parameters, is transmitted to the photo site 105. In response, the photo site 105 sequentially performs step S1901 and steps following that, shown in FIG. 19, to retrieve detailed information associated with the image data having the image ID described in the URL parameters from the mobile image information table 1100 and produce Web page information for displaying a mobile image information screen 2600 such as that shown in FIG. 26.

The detailed image information displayed in the mobile image information screen 2600 includes an image name 2601, the number of times the image has been viewed 2602, a comment 2603, and a link 2604 for returning the screen to the mobile album view screen 2500. The Web page information received from the mobile application server 204 is stored on the portable communication terminal 113 so that if the link 2604 is pressed on the portable communication terminal 113 is pressed, the mobile album view screen 2500 is again displayed on the basis of the stored Web page information.

In the case in which the link 2508 is pressed on the portable communication terminal 113B, data including the session ID, the album ID, and a detailed album information request, described in the URL parameters, is transmitted to the photo site 105. In response, the photo site 105 sequentially performs step S1901 and steps following that, shown in FIG. 19, to retrieve detailed information associated with the album having the album ID described in the URL parameters from the mobile album information table 1000 and produces Web page information for displaying the mobile album information screen. The mobile album information screen is similar to the mobile image information screen 2600 except that the name, the number of times viewed, and the comment associated not with the image but with the album are displayed, and thus a further description thereof is not given herein.

Step S2309: The mobile application server 204 transmits the Web page information produced in step S2308 to the content conversion server 205. Depending on the device type of the portable communication terminal 113 performing the access, the content conversion server 205 converts the Web page information and transmits it to the portable communication terminal 113.

Step S2311: If it is determined in step S2301 that the mobile image information table 1100 includes a record having a session ID identical to the session ID extracted from the URL parameters, the mobile application server 204 retrieves a corresponding image ID 1102 from the mobile image information table 1100, on the basis of the session ID, the album ID, and the image number, extracted from the URL parameters.

Step S2312: The mobile application server 204 determines whether the image ID 1102 acquired in step S2311 is included in the image IDs 801 described in the image information data table 800. If it is determined in step S2312 that the image ID 1102 is not included in the image IDs 801 described in the image information data table 800, the mobile application server 204 determines that the image has been deleted and the mobile application server 204 jumps the process to step S1936 shown in FIG. 19. In step S1936, an error notification screen 2400 is displayed on the browser running on the portable communication terminal 113, as shown in FIG. 24.

Step S2313: If it is determined in step S2312 that the image ID 1102 is included in the image IDs 801 described in the image information data table 800, the mobile application server 204 further determines whether the prohibition of viewing flag 811 is set to allow the image data to be viewed. If it is determined in step S2313 that the prohibition of viewing flag 811 is set to prohibit the image data from being be viewed, the mobile application server 204 jumps the process to step S1936 shown in FIG. 19.

Step S2314: If it is determined in step S2313 that the prohibition of viewing flag 811 is set to allow the image data to be viewed, the mobile application server 204 increments, by one, the number of times viewed 810 described in the image information data table 800. Thereafter, the mobile application server 204 sequentially performs step S2307 and steps following that.

As described above, the mobile application server 204 provides an album in such a manner that one of image data included in the album is displayed at a time on a portable communication terminal 113. This allows a reduction in time needed to provide an album to a portable communication terminal 113. However, the number of image data displayed at a time is not limited to one as is the case in the present embodiment in which one image data is displayed at a time to reduce the time needed to provide an album to a portable communication terminal 113, but two or more images may be displayed at a time depending on the restriction on the communication time specified by the carrier of the communication terminal 113.

Process Performed by the Photo Site to Produce Web Page Information for Portable Communication Terminal A process (step S2308 in FIG. 23) performed by the mobile application server 204 to produce Web page information for displaying the mobile album view screen 2500 on a browser running on a portable communication terminal 113 is described in further detail below with reference to FIG. 27.

Step S2701: The mobile application server 204 incorporates a thumbnail image described in the temporary area in the file server 209, dedicated to use by the mobile application server 204, into Web page information such that the thumbnail image is displayed in the image display area 2501.

Step S2702: The mobile application server 204 compares the data length in bytes of the image name 1104 described in the mobile image information table 1100 and the predetermined allowable maximum data length in bytes to determine whether the data length of the image name 1104 is smaller than the maximum allowable length.

Step S2703: If it is determined in step S2702 that the data length is equal to or smaller than the maximum allowable length, the mobile application server 204 directly describes the image name 1104 into the image name field 2502 of the Web page information.

Step S2704: However, if it is determined in step S2702 that the data length is greater than the maximum allowable length, the mobile application server 204 extracts a substring with a data length greater by one byte than the maximum allowable data length from the beginning part of the image name 1104 and examines the last byte and the byte immediately before that to determine whether those two bytes form a two-byte code character.

Step S2705: If it is determined in step S2704 that the two bytes described above form a two-byte code character, the mobile application server 204 removes the two-byte code character at the end of the substring of the image name 1104 and employs the resultant substring (which now has a data length smaller by 1 byte than the maximum allowable data length) as a character string to be displayed in the image name field 2502 of the Web page information.

Step S2706: If it is determined in step S2704 that the two bytes at the end of the substring do not form a two-byte code character, the mobile application server 204 extracts a substring with a length equal to the maximum allowable length from the image name 1104 and employs it as a character string to be displayed in the image name field 2502 of the Web page information.

Step S2707: The mobile application server 204 incorporates the image number 1107 described in the mobile image information table 1100 into the image number field 2503 of the Web page information.

Step S2708: The mobile application server 204 then incorporates the session ID 1101, the album ID 1103, and the image number, described in the mobile image information table 1100, into the Web page information so that those data will be incorporated into the URL parameters and transmitted when the link 2504 is pressed on a portable communication terminal 113.

In the "back" field of the Web page information, a value obtained by subtracting one from the image number 1107 is described. In the case in which the value obtained by subtracting one from the image number 1107 becomes equal to 0, the number of image data 1005 is described as the image number in the Web page information.

In the "next" field of the Web page information, a value obtained by adding one to the image number 1107 is described. In the case in which the value obtained by adding one to the image number 1107 becomes equal to or greater than the number of image data 1005, 1" is described as the image number in the Web page information.

Step S2709: Furthermore, in the Web page information, the mobile application server 204 describes information for displaying the image number input field 2505 in which an image number is input on a portable communication terminal 113.

Step S2710: Still furthermore, in the Web page information, the mobile application server 204 describes the session ID 1101 and the album ID 1103 described in the mobile image information table 1100 so that those data will be incorporated into the URL parameters and transmitted when the link 2506 is pressed. Furthermore, the Web page information is described so that a value input into the image number field 2505 is incorporated as the image number into the URL parameters.

Step S2711: Furthermore, in the Web page information, the mobile application server 204 describes the session ID 1101, the image ID 1102, and the album ID 1103, described in the mobile image information table 1100, so that those data will be incorporated into the URL parameters when the link 2507 is pressed.

Step S2712: Furthermore, in the Web page information, the mobile application server 204 describes the session ID 1101 and the album ID 1103 described in the mobile information table 1100 so that those data will be incorporated into the URL parameters when the link 2508 is pressed.

Step S2713: The mobile application server 204 incorporates the number of image data 1005 described in the mobile album information table 1000 into the Web page information so that the number of image data 1005 is displayed in the number of image data field 2509 indicating the total number of image data included in the album.

Step S2714: The PC application server 204 transmits the Web page information to the content conversion server 205. Depending on the device type of the portable communication terminal 113 performing the access, the content conversion server 205 converts the Web page information and transmits it to the portable communication terminal 113. Note that screens shown in FIG. 22 and FIGS. 24 to 26 are mere examples, and the details of the screens, such as the image sizes and manners in which characters are displayed, may be modified depending on the specifications, such as the screen size, of the portable communication terminal 113.

Other Embodiments

Although in the embodiments described above, the digital camera is employed as the image input apparatus, the present invention may also be applied to a system which deals with image data produced by another type of image input apparatus or which deals with document data.

Note that the present invention is not limited to the system described above with reference to specific embodiments, but the present invention may be applied to a wide variety of portable telephones which are connected to an external apparatus, such as a server, via a communication line.

Furthermore, although in the embodiments described above, service for printing of image data is provided, the present invention may be applied not only to a printing service, but also service for outputting, on a monitor display or via an audio playback apparatus, content data which may include not only image data but also document data, and/or audio data. Furthermore, although in the embodiments described above, the mobile application server 204 and the PC application server 203 are formed into separate apparatus, they may be integrated into a single apparatus functioning as both the mobile application server 204 and the PC application server 203.

The objects of the present invention may also be achieved by providing to a system or an apparatus a storage medium having software program code stored thereon for implementing the functions disclosed in the embodiments described above and by executing the program code on a computer (or a CPU or an MPU) disposed in the system or the apparatus. In this case, the program code stored on the storage medium implements the functions disclosed in the embodiments described above, and the storage medium on which the program code is stored falls within the scope of the present invention. The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

When the present invention is practiced using the storage medium, program code, including the program code corresponding to the process described with reference to flow charts, is stored on the storage medium.

According to the present invention, as described above, a plurality of contents are stored in the form of albums and albums are provided to communication terminals in an optimum mode selected from a plurality of modes depending on the device type or specifications such as a display capability or communication capability of a communication terminal. More specifically, for a portable communication terminal, an album is provided in a mode in which one of contents included in the album is displayed at a time, thereby allowing the album to be provided in a short time to the communication terminal without encountering an error which may otherwise occur due to limitations imposed by a carrier communication terminal on the communication time and/or the data size being transmitted and which may make it impossible for communication terminals to receive some albums.

In the case in which a communication terminal is a personal computer, unlike the previous case in which only one of contents included in an album is displayed at a time on a portable communication terminal, an album is provided in a mode in which a plurality of contents included in the album are displayed at a time. Thus, albums are provided in an optimum mode selected depending on the display capability of communication terminals.

By storing a copy of a content and/or a copy of data indicating attributes of the content, it becomes possible to produce information for displaying the content and/or the attributes of the content in an efficient manner when the same content is again accessed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information providing system that communicates with a communication terminal via a network, comprising:
   a storage unit configured to store a plurality of image files being linked to album data;
   a receiving unit configured to receive a request from the communication terminal for acquiring the album data;
   a detection unit configured to detect, based on the received request, whether the communication terminal is or is not a portable communication terminal;
   a generation unit configured to generate, in a case where the detection unit detects tat the communication terminal is not a portable communication terminal, first screen information that includes all of the plurality of image files linked to the requested album data, and in a case where the detection unit detects that the communication terminal is a portable communication terminal, to generate second screen information that includes an image area and a display control area, wherein the image area includes one or more image files but fewer than all image files of the plurality of image files linked to the requested album data, and wherein the display control area includes a control for requesting remaining image files linked to the requested album data and a field for displaying a total number of image files linked to the requested album data;

a transmission unit configured to transmit either the first screen information or the second screen information generated by said generation unit, to the communication terminal;

a determination unit configured to determine whether or not a session ID is included in the request received by the receiving unit, in a case where the detection unit detects that the communication terminal is a portable communication terminal;

an issuing unit configured to issue a new session ID to the communication terminal, in a case where the determination unit determines that the session ID is not included in the request, wherein the issued new session ID is included in all requests from the communication terminal to the information providing system after the issuance of the new session ID; and an album monitor updating unit configured to update the number of times the album data has been viewed when the receiving unit receives the request from the communication terminal, wherein the album monitor updating unit does not update the number of times the album data has been viewed in a case where the communication terminal is detected to be a portable communication terminal and a session ID is also determined to be included in the request.

2. The information providing system according to claim 1, wherein the communication terminal has a Web browsing capability, and the first screen information and the second screen information are described in a Web page description language.

3. The information providing system according to claim 1, wherein each image file included in the first screen information or the second screen information is a thumbnail image file.

4. The information providing system according to claim 1, wherein the image area of the second screen information includes exactly one single image file.

5. The information providing system according to claim 1, wherein the image area of the second screen information includes two or more image files.

6. An information providing method for an information providing system that communicates with a communication terminal via a network, the method comprising:

storing, in the information providing system, a plurality of image files linked to album data;

receiving, by the information providing system, a request from the communication terminal for acquiring the album data;

detecting, by the information providing system, based on the received request, whether or not the communication terminal is a portable communication terminal;

generating, by the information providing system, in a case where the detecting step detects tat the communication terminal is not a portable communication terminal, first screen information that includes all of the plurality of image files linked to the requested album data, an generating, by the information providing system, end in a case where the detecting step detects tat the communication terminal is a portable communication terminal, second screen information that includes an image area and a display area, wherein the image area includes one or more image files but fewer than all image files of the plurality of image files linked to the requested album data, and wherein the display control area includes a control for requesting remaining image files linked to the requested album data and a field for displaying a total number of image files linked to the requested album data;

transmitting, by the information providing system, either the first screen information or the second screen information generated by said generating step, to the communication terminal;

determining whether or not a session ID is included in the request received by the receiving step, in a case where the detecting step detects that the communication terminal is a portable communication terminal;

issuing a new session ID to the communication terminal, in a case where the determining step determines that the session ID is not included in the request, wherein the issued new session ID is included in all requests from the communication terminal to the information providing system after the issuance of the new session ID; and updating the number of times the album data has been viewed when the receiving unit receives the request from the communication terminal, wherein the number of times the album data has been viewed is not undated in a ease where the communication terminal is detected to be a portable communication terminal and a session ID is also determined to be included in the request.

7. The information providing method according to claim 6, wherein the image area of the second screen information includes exactly one single image file.

8. The information providing method according to claim 6, wherein the image area of the second screen information includes exactly two or more image files.

9. A computer readable storage medium on which is stored a computer program of an information providing method for an information providing system that communicates with a communication terminal via a network, the method comprising:

storing, in the information providing system, a plurality of image files linked to album data;

receiving, by the information providing system, a request from the communication terminal for acquiring the album data;

detecting, by the information providing system, based on the received request, whether or not the communication terminal is a portable communication terminal;

generating, by the information providing system, in a case where the detecting step detects that the communication terminal is not a portable communication terminal, first screen information that includes all of the plurality of image files linked to the requested album data, and generating, by the information providing system, in a case where the detecting step detects that the communication terminal is a portable communication terminal, second screen information that includes an image area and a display control area, wherein the image area includes one or more image files but fewer than all image files of the plurality of image files linked to the requested album data, and wherein the display control area includes a control for requesting remaining image files linked to the requested album data and a field for displaying a total number of image files linked to the requested album data;

transmitting, by the information providing system, either the first screen information or the second screen information generated by said generating step, to the communication terminal;

determining whether or not a session ID is included in the request received by the receiving step, in a case where the detecting step detects that the communication terminal is a portable communication terminal;

issuing a new session ID to the communication terminal, in a case where the determining step determines that the session ID is not included in the request, wherein the issued new session ID is included in all requests from the communication terminal to the information providing system after the issuance of the new session ID; and updating the number of times the album data has been viewed when the receiving unit receives the request from the communication terminal, wherein the number of times the album data has been viewed is not updated in a case where the communication terminal is detected to be a portable communication terminal and a session ID is also determined to be included in the request.

10. The computer readable storage medium according to claim 9, wherein the image area of the second screen information includes exactly one single image file.

11. The computer readable storage medium according to claim 9, wherein the image area of the second screen information includes exactly two or more image files.

* * * * *